US00RE36184E

United States Patent [19]

Shimada et al.

[11] E Patent Number: Re. 36,184

[45] Reissued Date of Patent: Apr. 6, 1999

[54] CAMERA HAVING AN AUTOMATIC FILM LOADING MECHANISM

[75] Inventors: Takahisa Shimada, Sakai; Junichi Tanii, Izumi; Ikushi Nakamura, Sakai; Masaaki Chikasaki, Toyonaka; Sadafusa Tsuji, Tondabayashi, all of Japan

[73] Assignee: Minolta Co., Ltd., Osaka, Japan

[21] Appl. No.: 545,285

[22] Filed: Oct. 19, 1995

Related U.S. Patent Documents

Reissue of:

[64] Patent No.: 5,255,034
Issued: Oct. 19, 1993
Appl. No.: 974,384
Filed: Nov. 10, 1992

U.S. Applications:

[63] Continuation of Ser. No. 744,639, Aug. 8, 1991, abandoned, which is a continuation of Ser. No. 446,055, Dec. 5, 1989, abandoned.

[51] Int. Cl.[6] ..... G03B 1/18

[52] U.S. Cl. ..... 396/409; 396/415; 396/418

[58] Field of Search ..... 396/387, 406, 396/409, 415, 418

[56] References Cited

U.S. PATENT DOCUMENTS

| | | | |
|---|---|---|---|
| 4,502,770 | 3/1985 | Shimada et al. | 396/409 |
| 4,530,582 | 7/1985 | Hara | 396/440 |
| 4,697,900 | 10/1987 | Euguchi et al. | 396/284 |
| 4,779,111 | 10/1988 | Ogawa et al. | 396/409 |
| 4,870,437 | 9/1989 | Omaki | 396/29 |
| 4,878,075 | 10/1989 | Cannon | 396/390 |

FOREIGN PATENT DOCUMENTS

| | | |
|---|---|---|
| 62-218952 | 9/1987 | Japan . |
| 62-238544 | 10/1987 | Japan . |
| 62-239135 | 10/1987 | Japan . |
| 62-239435 | 10/1987 | Japan . |
| 62-251734 | 11/1987 | Japan . |

*Primary Examiner*—David M. Gray
*Attorney, Agent, or Firm*—Sidley & Austin

[57] ABSTRACT

A camera according to the present invention is a camera which feeds a film from a film feed opening of a patrone chamber and it includes a film feeder for feeding the film drawn from the film feed opening to a spool chamber through a film exposure portion, a detector for detecting whether or not the fed film passes through the film exposure portion, and a controller for controlling operation of the film feeder in response to an output of the detector.

21 Claims, 14 Drawing Sheets

CAMERA HAVING AN AUTOMATIC FILM LOADING MECHANISM

Matter enclosed in heavy brackets [ ] appears in the original patent but forms no part of this reissue specification; matter printed in italics indicates the additions made by reissue.

This application is a continuation of application Ser. No. 07/744,639, filed Aug. 8, 1991, which, in turn, is a continuation of application Ser. No. 07/446,055, filed Dec. 5, 1989, both now abandoned.

BACKGROUND OF THE INVENTION

1. Field of the Invention

The present invention relates to cameras and particularly to a camera capable of automatically winding up a film contained in a film patrone or a film cartridge.

2. Description of the Related Art

In a conventional camera, a patrone chamber or a cartridge chamber has only a function of containing a film patrone. In loading a film in a camera, a back cover is at first opened for example, and the film patrone is put in the patrone chamber. Then, the user holds by hand the film outside the film patrone and sets the film in a course from the patrone chamber to a film spool via a film exposure portion. After that, the film is advanced by manual operation of a winding lever by the user, or by operation of an automatic film winding device after closing of the back cover and so on.

According to the above described prior art, when a film is to be loaded in the camera, handling of the film is troublesome, since the user has to set the film in a prescribed position or inserts the film into an opening of the film spool. This problem exists not only in a camera in which a film is manually wound, but also in a camera provided with an automatic film winding device.

In order to solve such problem of the prior art, the assignee company of the present invention proposed in Japanese Patent Laying Open No. 62-156641 (U.S. Pat. No. 4,870,437) a camera capable of automatically winding up a film contained in a film patrone and having a compact patrone chamber.

Even the above mentioned camera proposed by the assignee company of the present invention has an insufficient function from a viewpoint of automatic loading. In such a camera, a film lead is automatically fed over the film exposure opening to the spool chamber, and on that occasion, it happens that the film lead falls in the exposure opening or catches on an end wall of the opening. If the film feeding operation continues in that condition, the film might be damaged or trouble in the film feeding device might occur.

SUMMARY OF THE INVENTION

An object of the present invention is to improve reliability of film loading in a camera having an automatic film loading mechanism.

Another object of the present invention is to cause no damage to a film or a film loading device in film loading in a camera having an automatic film loading mechanism.

Still another object of the present invention is to feed a film with reliability in a camera having an automatic film loading mechanism.

A further object of the present invention is to detect easily abnormality in film loading in a camera having an automatic film loading mechanism.

A still further object of the present invention is to improve reliability of film loading in a film loading method of a camera.

In order to accomplish the above described objects, a camera according to an aspect of the present invention has a function of feeding a film from a film feed opening of a patrone chamber and it includes a film feeder for feeding the film fed from the feed opening to the spool chamber through a film exposure portion, a detector for detecting a condition as to whether the fed film has passed through the film exposure portion or not, and a controller for controlling operation of the film feeder in response to the output of the detector.

In order to accomplish the above described objects, a camera according to another aspect of the present invention includes a patrone chamber for containing a film patrone, a spool chamber for winding the film, a film exposure portion having a frame constituting an opening for applying exposure to the film, a film feeder for feeding the film from the film feed opening of the patrone chamber to the spool chamber through the film exposure portion, and a guide means movable between a first position covering at least a part of the opening and a second position recessed from the opening, located in the first position when the lead of the film passes through the film exposure portion, to prevent the lead of the film from entering the opening, and moving to the second position after the lead of the film has passed through the film exposure portion.

In order to accomplish the above described objects, a film loading method according to still another aspect of the present invention includes the steps of feeding a film from a feed opening of the film to a film winding portion; detecting whether the fed film has passed through a prescribed point between the film feed opening and the film winding portion; and controlling the feeding of the film dependent on whether or not the film has passed through the prescribed point.

According to the camera having the automatic film loading mechanism thus constructed as well as the film loading method thereof, feeding and winding of the film are controlled dependent on the film feeding conditions and accordingly, it is possible to prevent damage to the film and the film loading device and to carry out film loading operation with high reliability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
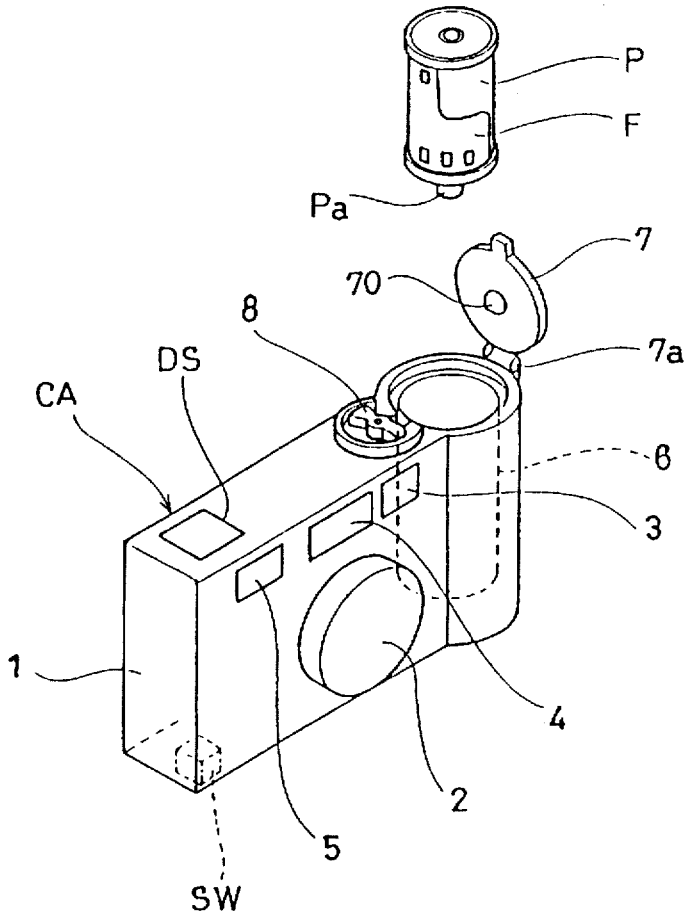
FIG. 2 is a perspective view showing an entire construction of a camera body according to the embodiment of the invention.

FIG. 2 is a perspective view showing an entire construction of a camera according to an embodiment of the present invention.

With reference to the figure, the construction will be described.

A camera CA comprises a taking lens 2 located almost at the center of the front face of a camera body 1, a view finder window 3 located in an upper portion, a flash window 4 for emitting flashlight, and a luminance detection/distance measurement window 5 for receiving information from an object. A patrone chamber or a film cartridge chamber 6 for containing a film patrone or a film cartridge (a JIS 135 film cartridge) P is formed in an upper right side end portion of the camera body 1.

A cover 7 for opening and closing an upper opening of the patrone chamber 6 is provided in the camera body 1 rotatably around an axis 7a, and a lock lever 8 for locking the cover 7 in the closed position is provided adjacent to the upper opening of the patrone chamber 6. The lock lever 8 is supported rotatably between a lock position for locking the cover 7 in the closed position and a lock cancel position.

Figure 4:
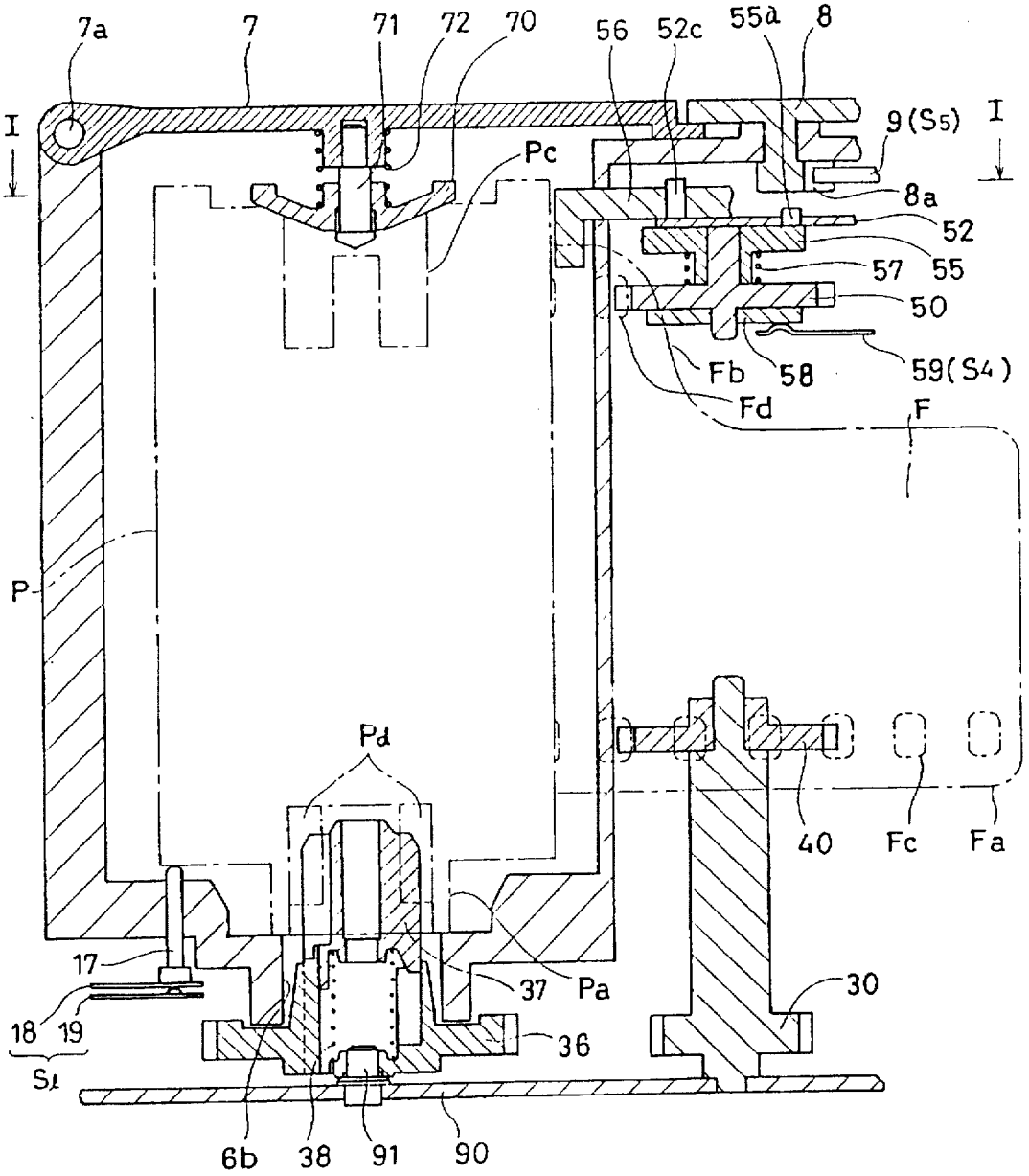
FIG. 4 is a vertical sectional view showing the patrone chamber of FIG. 1 and its surroundings.

As shown in FIG. 4 which will be described later, a lock switch Ss normally open is closed in the lock position by an operation member 8a acting on a contact piece 9. A stop member for stopping the lock lever 8 in the lock position may be further provided. Referring back to FIG. 2, a display DS for displaying various information is provided in an upper portion of the camera body 1 and a switch SW to be used for the purpose of rewinding the film is provided in a lower portion thereof.

The patrone chamber 6 has a substantially cylindrical form and its inner diameter is slightly larger than a distance from the outermost edge of a film drawing portion Pb of the film patrone P to an opposite outer wall of the film patrone P through the axial center of the patrone. More specifically, assuming that the inner diameter of the patrone chamber 6 is D1, that the distance from the center of the film patrone P to the outermost edge of the film drawing portion Pb is d1, and that the radius of the cylindrical portion of the film patrone d2, the following relation is obtained.

$$2d1>D1>d1+d2$$

Thus, the center of the film patrone P in the patrone chamber 6 is eccentric with respect to the center of the patrone chamber 6.

Figure 1:
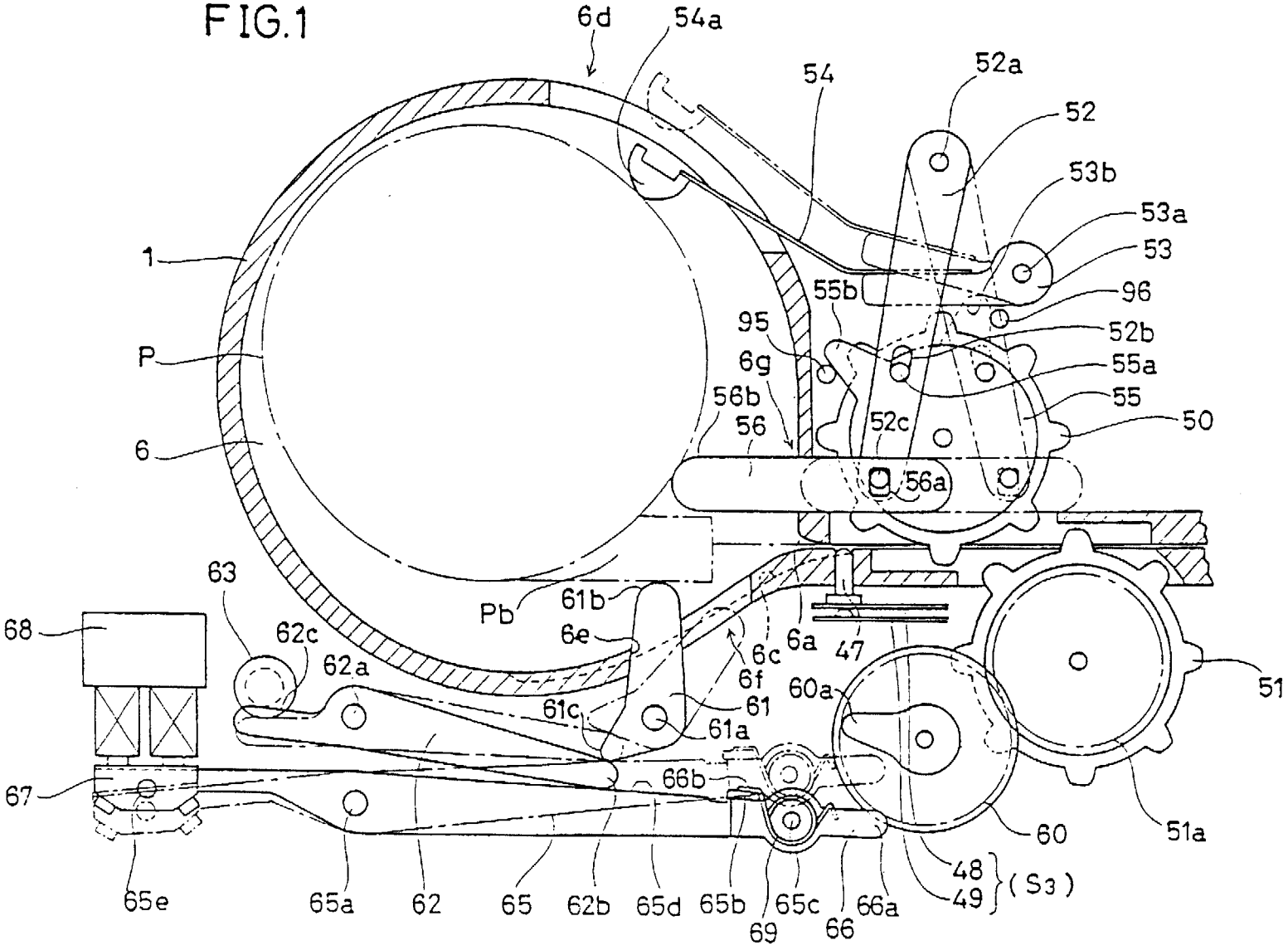
FIG. 1 is a sectional view showing details of a patrone chamber and its surroundings according to an embodiment of the present invention.
Figure 3A:
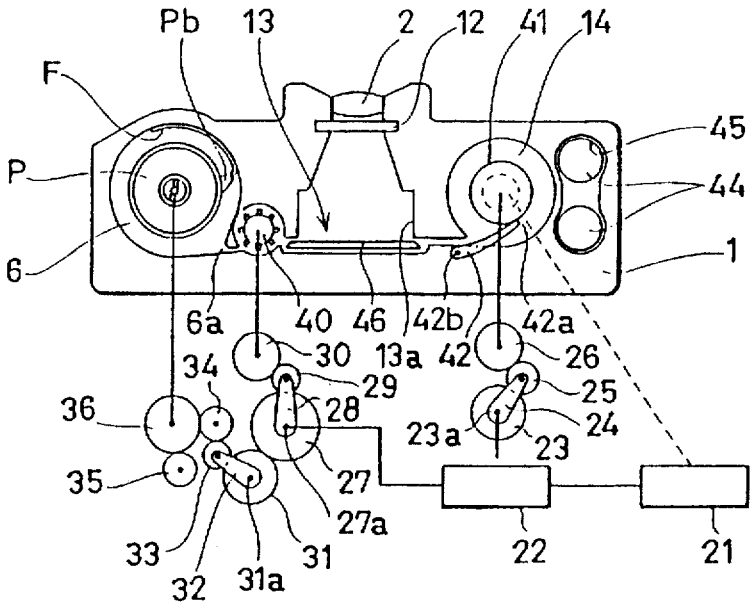
FIGS. 3A to 3C are schematic views showing film loading operation of the camera of FIG. 2.
Figure 3B:
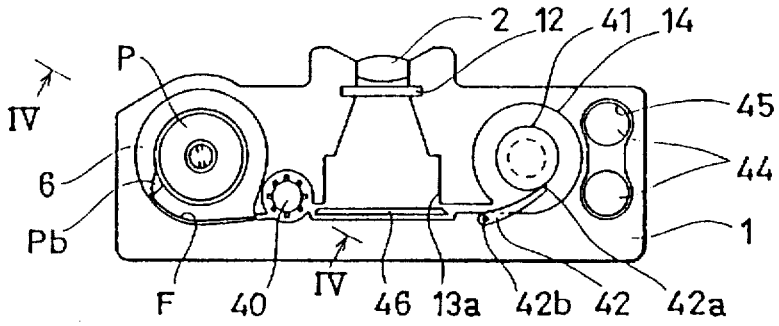
Figure 3C:
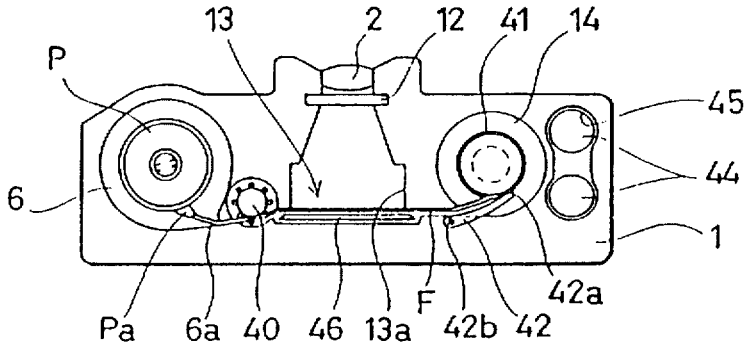

FIGS. 3A to 3C are schematic views showing an internal mechanism and a drive transmission mechanism of the camera according to the embodiment of the invention. In FIGS. 3A to 3C, the center of the film patrone P coincides with the center of the patrone chamber 6 for the purpose of simplifying the illustrations, but in reality the center of the film patrone P is eccentric as shown in FIG. 1.

With reference to the figures, loading operation will be described.

The camera CA contains, in addition to the patrone chamber 6, a film feed sprocket 40, a taking lens 2, a shutter 12, a film exposure portion 13, a spool chamber 14, a spool 41 containing a motor 21 (M), a film guide lever 42, a battery chamber 45 with a power battery 44, and a film pressure plate 46.

A slit type film feed opening 6a is formed in a sidewall of the patrone chamber 6 in the axial direction of the film patrone P. The film feed sprocket 40 is located near the feed opening 6a and it is driven by the motor through a transmission system described later to feed the film F rightward in the figure. The film feed sprocket 40 has pawls with which only the lower side (the leading elongate portion) perforations Fc of the film F engages as shown in FIG. 4 which will be described later.

A sidewall 6c (shown by the dotted line in FIG. 1) near the film feed opening 6a of the patrone chamber 6 is a portion receiving the leading elongate portion of the film F and it is formed to have a recessed surface serving as a guide so that the film lead Fa is guided to the film feed opening 6a. The guide lever 42 has a roller 42a provided rotatably at its top end and it is provided rotatably around a fixing shaft 42b. It is actuated by a spring (not shown) so that the roller 42a is elastically pressed against the spool 41. The guide lever 42 guides the lead Fa of the film F reaching the spool chamber 14 so that it advances around the spool 41 counterclockwise as shown in the figure, and it presses the film F on the spool 41 so that the film is wound reliably.

The taking lens 2 is adapted to effect automatic focusing for an object by using a lens drive device based on the information of the distance to the object detected by the distance measuring device. The distance measuring device and the lens drive device corresponds to an auto focus control circuit AF shown in FIG. 10, which will be described afterwards.

A shutter 12 is a so-called program lens shutter having an aperture changing with time. It is constructed so that exposure is automatically controlled by an exposure controller (shown as EC in FIG. 10) based on luminance information of the object detected by a light measuring circuit (shown as ML in FIG. 10).

Next, the drive transmission mechanism for transmitting drive force from the motor 21 to a fork 37 (to be described later), the film feed sprocket 40 and the spool 41 will be described.

As shown in FIG. 3A, the drive force of the motor 21 is transmitted to a gear 23 and a gear 27 through a reduction gear system 22. A planetary gear 25 engaging with the gear 23 is provided rotatably in a lever 24 supported rotatably in a rotating shaft 23a of the gear 23. The planetary gear 25 moves to a position enabling engagement with a spool drive gear 26 when the gear 23 rotates counterclockwise in the figure, and moves to a position causing disengagement from the spool drive gear 26 when the gear 23 rotates clockwise.

The spool drive gear 26 rotates together with the spool 41 and it enables the spool 41 to rotate counterclockwise when the gear 23 rotates counterclockwise to engage the planetary gear 25 with the spool drive gear 26. A planetary gear 29 engaging with the gear 27 is provided rotatably in a lever 28 supported rotatably on a rotating shaft 27a of the gear 27. The planetary gear 29 moves to a position enabling engagement with the sprocket drive gear 30 when the gear 27 rotates counterclockwise, and moves to a position enabling disengagement from the sprocket drive gear 30 when the gear 29 rotates clockwise.

As shown also in FIG. 4, the sprocket drive gear 30 rotates together with the film feed sprocket 40. When the gear 27 rotates counterclockwise to engage the planetary gear 29 with the sprocket drive gear 30, the gear 30 rotates the film feed sprocket 40 counterclockwise so that the sprocket 40 engages with the perforations Fc of the elongate lead portion of the film F to transport the film F to the spool chamber 14.

The gear 31 engages with the gear 27, and the planetary gear 33 engaging with the gear 31 is provided rotatably on the lever 32 supported rotatably on the rotating shaft 31a of the gear 31. This planetary gear 33 moves to a position enabling engagement with the gear 34 when the gear 31 rotates clockwise, and moves to a position enabling engagement with the gear 35 when the gear 31 rotates counterclockwise. Both of the gears 34 and 35 engage with a fork drive gear 36, which rotates the fork 37 integrally. While the gear 23 rotates counterclockwise, the gear 27 also rotates counterclockwise, whereby the gear 31 rotates clockwise.

When the film feed sprocket 40 rotates counterclockwise to transport the film F to the spool chamber 14, a speed for rotating the fork 37 and the fork drive gear 36 through the patrone shaft Pa following the transported film F is set to a speed faster than the speed for driving the fork drive gear 36 and the fork 37 directly by the motor 21.

When the film F is wound on the spool 41 by the counterclockwise rotation of the spool 41, the speed for rotating the film feed sprocket 40 and the sprocket drive gear 30 following the fed film F is set to a speed faster than the speed for driving the sprocket drive gear 30 and the film feed sprocket 40 directly by the motor 21.

Figure 5:
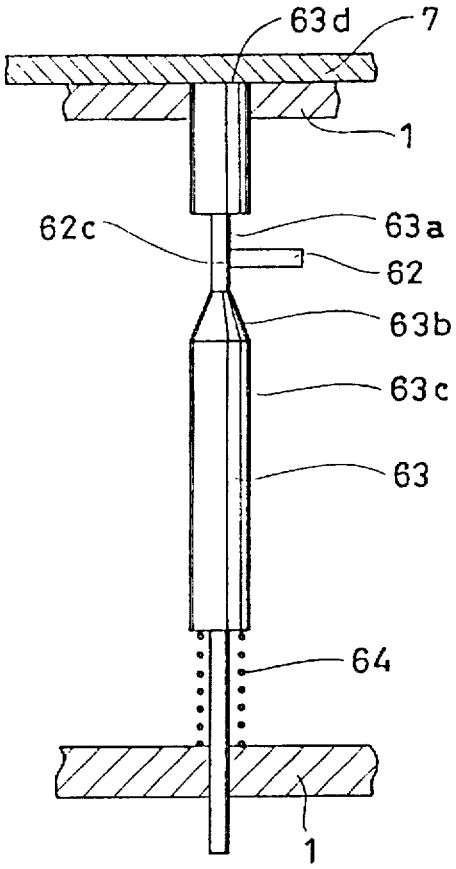
FIG. 5 is a view showing a relation between a patrone release lever and a charge shaft shown in FIG. 4.
Figure 6:
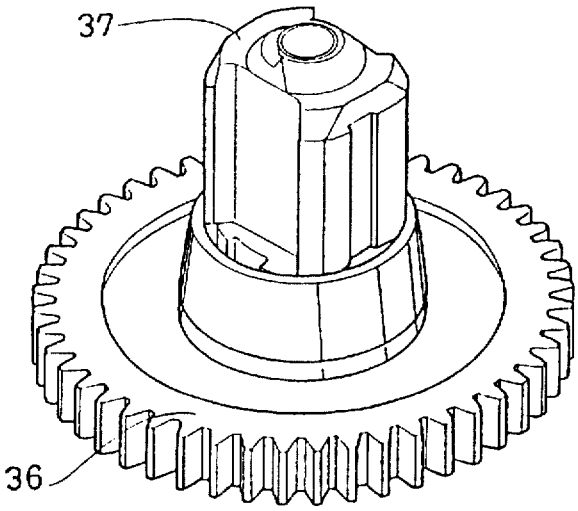
FIG. 6 is a perspective view showing a fork and a fork gear according to the embodiment of the invention.

FIG. 4 is a sectional view taken along IV—IV in FIG. 3B. FIG. 1 is a sectional view taken along I—I in FIG. 4. FIG. 5 is a view of a structure of a patrone release lever in FIG. 1. FIG. 6 is a perspective view showing a structure of a fork and a fork gear in FIG. 4.

The structures shown in those figures will be described.

A guide member support shaft 71 is fixed to the cover 7 in an internal central portion of the cover 7 and a guide member 70 is provided rotatably around the support shaft 71. The guide member 70 is actuated downward by a spring 72 and it engages with a not projecting cylindrical patrone shaft Pc and regulates the position of the film patrone P in the axial direction in a state in which the film patrone P is contained in the patrone chamber 6. The surface of the guide member 70 engaging with the patrone shaft Pc is a conical surface which causes the film patrone P to be eccentric with respect to the patrone chamber 6 by means of the spring 72.

A fork 37 engaging with the projecting cylindrical patrone shaft Pa of the patrone P is provided in a lower central portion of the patrone chamber 6 and the fork 37 projects into the patrone chamber 6 through an opening 66 in the lower central portion of the patrone chamber 6. As shown in FIG. 6, the fork 37 has a form engaging with a key Pd in the patrone shaft Pa, making it possible to rotate the patrone P in either of the regular and reverse directions. The fork 37 rotates together with the fork drive gear 36 and it is movable vertically with respect to the fork drive gear 36. The fork 37 is actuated upward by the spring provided between the fork drive gear 36 and the fork 37 and it is held in a position engageable with the patrone shaft Pa.

A length of engagement between the fork drive gears 36 and the fork in this position is made short, leaving margins for the engagement. Thus, the fork 37 is engageable with the fork drive gear 36 in a slanted manner. Consequently, the fork 37 together with the guide member 70 of the cover 7 makes it possible to rotate the film patrone P eccentrically with respect to the patrone chamber 6. This construction makes it possible to reduce the inner diameter of the patrone chamber 6 compared with a construction where the film patrone P rotates not eccentrically with respect to the patrone chamber 6.

Since the fork 37 and the guide member 70 are located substantially at the center of the patrone chamber 6, the guide member 70 smoothly engages with the patrone shaft Pc when the cover 7 is closed no matter what position the film drawing portion Pb exists. If the phase of the fork 37 is not coincident with the phase of the key Pd in the patrone shaft Pa, the fork 37 is moved downward by the patrone shaft Pa in opposition to the spring 38. If the fork 37 rotates and both phases coincide with each other, the fork 37 is moved upward by the spring 38 to engage with the patrone shaft Pa. The fork drive gear 36 is rotatable around a shaft 91 fixed to a base plate 90 fixed to the camera body 1 and it is driven by the motor through the above mentioned transmission system.

Follower sprockets 50, 51 engage with the perforations Fd of the receding portion (the upper side in FIG. 4) of the film F. A drive member 55 rotating coaxially with the follower sprocket 50 is provided on the upper side of the follower sprocket 50. A spring 57 is provided between the drive member 55 and the follower sprocket 50. The spring 57 transmits the rotation of the follower sprocket 50 to the drive member 55 and when a load more than a prescribed value is applied to the drive member 55, the follower sprocket 50 and the drive member 55 are functioned as sliding on each other.

A pin 55a is provided in an upper portion of the drive member 55 and the pin 55a is fitted in an elongate hole 52b of a drive lever 52. The drive lever 52 is rotatable around the shaft 52a and it has a pin 52c at its top end. The pin 52c engages with an elongate hole 56a of a patrone bearing lever 56. The patrone bearing lever 56 is guided movably leftward and rightward. Its top end portion 56b freely slips into and out of the patrone chamber 6 through the sidewall 6g of the chamber.

The drive portion 55 has a protruding portion 55b. The protruding portion 55b contacts pins 95, 96 fixed in the camera body 11 and the rotation of this portion 55b is regulated by those pins. When the drive member 55 rotates clockwise, the protruding portion 55b contacts a side surface 53b of a film information reading member base 53.

Figure 10:
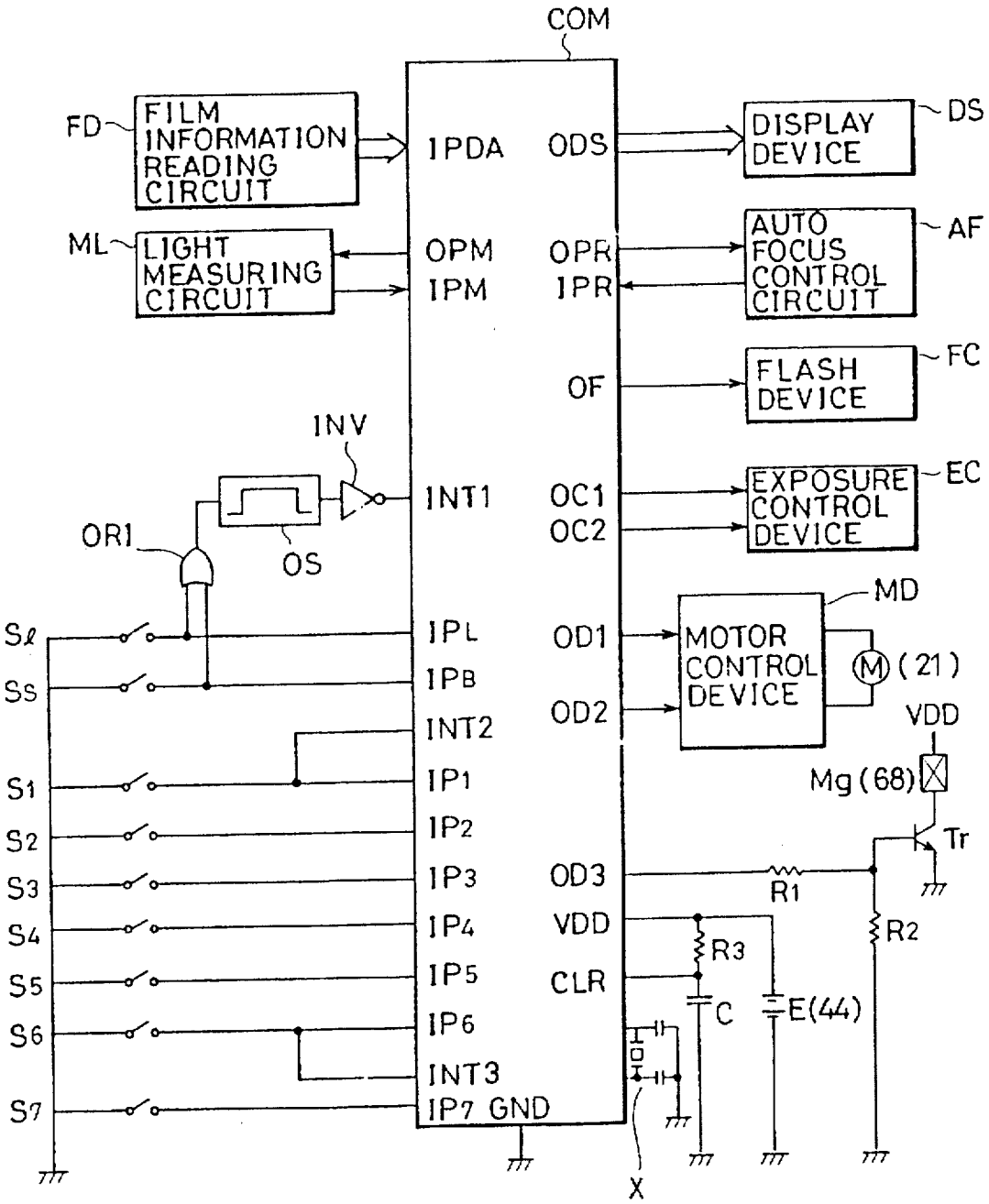
FIG. 10 is a control circuit diagram showing a construction or the respective components according to the embodiment of the invention.

The base 53 is rotatable around a shaft 53a and is actuated counterclockwise by a spring (not shown) but the rotation thereof is limited by a stopper (not shown). The base 53 is provided with a film information reading member 54 and this member 54 enters the patrone chamber 6 through a hole 6d provided in the sidewall of the chamber 6 to cause its top end portion 54a to contact the film patrone P. As a result, a pattern having information such as film sensitivity, provided on the film patrone P is recognized through the top end portion 54a, whereby the information can be read through a film information reading circuit (as shown in FIG. 10).

When the drive member 55 rotates counterclockwise, the drive lever 52 rotates clockwise through the pin 55a to move the patrone support lever 56 leftward in the figure through the pin 52c. Then, the top end 56b enters the patrone chamber 6. Since the protruding portion 55b of the drive member 55 is separated from the base 53, the base 53 rotates counterclockwise as a result of the separation. Then, the top end 54a of the reading member 54 enters the patrone chamber 6 (as shown by the solid lines).

When the drive member 55 rotates clockwise, the drive lever 52 rotates counterclockwise through the pin 55a. The patrone support lever 56 moves rightward in the figure through the pin 52c and its top end 56b moves outside the patrone chamber 6. The protruding portion 55b of the drive member 55 contacts an end surface 53b of the base 53 and rotates it clockwise in opposition to the actuating force, so that the top end 54a of the reading member 54 moves outside the patrone chamber 6 (as shown by the chain lines).

A substrate 58 is fixed on the lower surface of the follower sprocket 50. The substrate 58 has a contact pattern and a signal (corresponding to S4 in FIG. 10) is read by two contact pieces 59. This contact pattern has a shape for forming pulses so that prescribed pulses are generated for one frame.

The follower sprocket 51 has a gear 51a rotating together and the gear 51a engages with a gear 60. The gear 60 has a protruding portion 60a in its upper portion. A patrone pressing lever 61 is rotatable around a shaft 61a. A top end portion 61b of the lever 61 can move into and out of the patrone chamber 6 through a hole 6f in the sidewall of the chamber 6.

The patrone pressing lever 61 is actuated counterclockwise by a spring (not shown) and its rotation is limited by the contact with a wall 6e of the hole 6f. Another end 61c of the patrone pressing lever 61 is opposite to an end 62b of a patrone release lever 62. The patrone pressing lever 62 is rotatable around a shaft 62a and it is actuated clockwise by a spring (not shown). Another end surface 62c of the patrone release lever 62 is opposite to a shaft 63 as shown in FIG. 5. The shaft 63 is movable vertically while being engaged with openings formed in the camera body 1. A spring 64 is provided on the lower side of the shaft 63. The shaft 63 is actuated upward by the spring 64.

When the cover 7 is closed, the upper end surface 63d of the shaft 63 is pressed by the cover 7 and the spring 64 is charged, obstructing upward movements of the shaft 63. On that occasion, the side end surface 62c of the patrone release lever 62 contacts a narrow portion 63a of the shaft 63.

When the cover 7 is opened, the shaft 63 moves upward by means of the spring 64. At this time, the patrone release lever 62 is rotated counterclockwise in opposition to the actuating force by means of the tapered portion 63b of the shaft 63. When the patrone release lever 62 rotates counterclockwise, its top end 62b contacts the end 61c of the patrone pressing lever 61 to rotate the patrone pressing lever 61 clockwise in opposition to the actuating force. When the portion 63c of the larger diameter of the shaft 63 rises to the patrone release lever 62, the top end 61b of the patrone pressing lever 61 moves outside the patrone chamber 6 (as shown by the chain lines). The force of the spring 64 is sufficiently strong for rotating the patrone pressing lever 61 and the patrone release lever 62.

A lever 65 is rotatable around the shaft 65a and an absorption piece 67 is attached to one end 65e of the lever 65. The absorption piece 67 is attracted by a permanent magnet of a combination magnet 68. Although the lever 65 is actuated counterclockwise by a spring (not shown), the absorption force between the absorption piece 67 and the magnet 68 is stronger than the actuating force. Accordingly, the absorption piece 67 can be kept absorbed by the magnet.

When electric current flows in the form of pulses in the electromagnet coil of the combination magnet 68, the magnetic force of the permanent magnet is cancelled and the absorption force of the magnet 68 disappears, causing the lever 65 to rotate counterclockwise. The end surface 65d of the lever 65 contacts the top end portion 62b of the patrone release lever 62 to rotate the patrone release lever 62 counterclockwise in opposition to the actuating force, whereby the patrone pressing lever 61 rotates clockwise in opposition to the actuating force to let its top end 61b out of the patrone chamber 6.

A charge lever 66 is supported rotatably in the top end 65c of the lever 65 and it is actuated clockwise by a spring 69, the rotation of the charge lever 66 being limited by contact of its side end surface 66b with a bent portion 65b of the lever 65. The other end 66a is opposite to the protruding portion 60a of the gear 60 and when the lever 65 rotates counterclockwise as a result of conduction of the magnet 68, the top end 66a of the charge lever 66 enters a rotation locus range of the protruding portion 60a of the gear 60.

When the gear 60 rotates counterclockwise, the protruding portion 60a contacts and presses the top end 66a of the charge lever 66 to rotate the charge lever 66 together with the lever 65 clockwise around the shaft 65a, whereby the absorption piece 67 is absorbed by the magnet 68. Even if the protruding portion 60a contacts the top end 66a of the charge lever 66 while the gear 60 is rotating clockwise, only the charge lever 66 is rotated counterclockwise around the shaft 65c in opposition to the spring 65 and the lever 65 does not move. When the protruding portion 60a is separated from the charge lever 66, the charge lever 66 rotates again until the end surface 66b thereof contacts the bent portion 65b of the lever 65, and returns to the initial state. When the absorption piece 67 is absorbed on the magnet 68, the patrone release lever 62 rotates clockwise until it contacts the portion 63a of the smaller diameter of the shaft 63 if the cover 7 is closed. The patrone pressing lever 61 rotates counterclockwise by the actuating force and its top end 61b enters the patrone chamber 6.

Figure 7A:
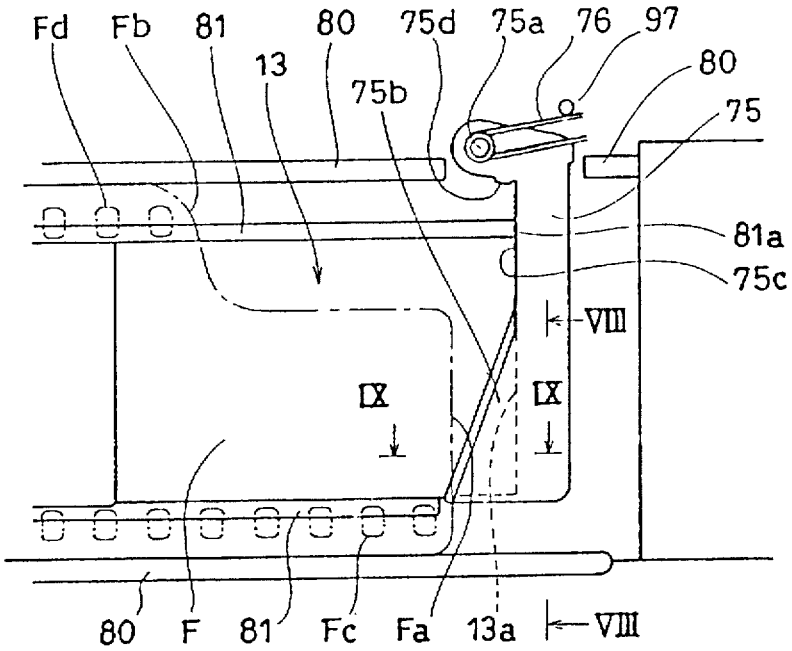
FIGS. 7A and 7B are views for explanation of a film curling preventing mechanism according to the embodiment of the invention.
Figure 7B:
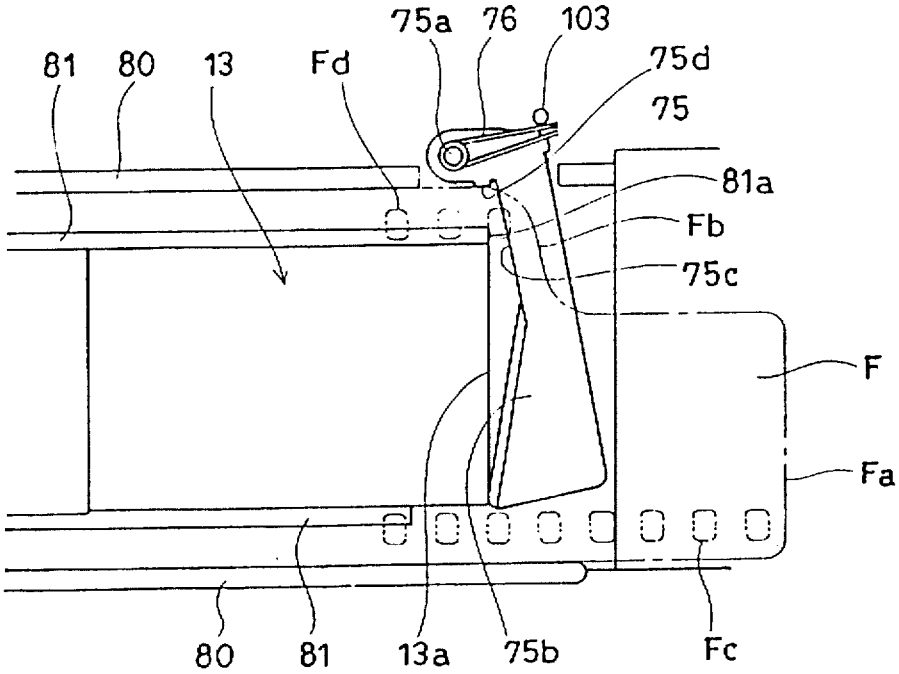
Figure 8:
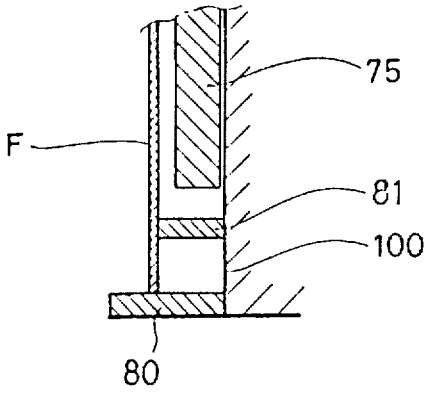
FIG. 8 is a sectional view taken along VIII—VIII in FIG. 7A.
Figure 9:
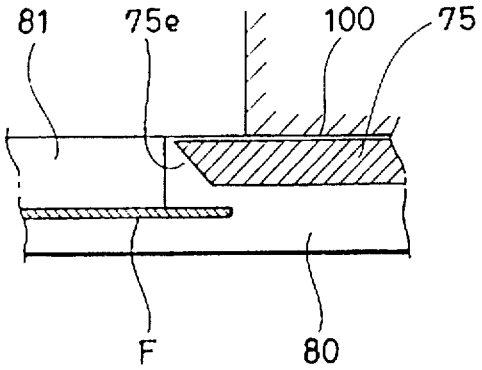
FIG. 9 is a sectional view taken along IX—IX in FIG. 7A.

FIGS. 7A and 7B are views for explaining a film curling preventing mechanism according to the embodiment of the invention. FIG. 8 is a sectional view taken along VIII—VIII in FIG. 7A. FIG. 9 is a sectional view taken along IX—IX in FIG. 7A.

The operation of the mechanism will be described with reference to those figures.

When the film F is to be fed to the spool chamber 14 by the film feed sprocket 40, the film F needs to pass through the film exposure portion 13. The lead Fa of the film F has a narrow width and it is liable to curl and to fall toward the taking lens via the film exposure portion. If such curling exists, the lead Fa of the film F is caught on a surface 13a of the spool chamber side, which is one side of the picture frame, and the film F cannot advance further. Therefore, means for preventing curling of the film is required. More specifically, a lever 75 of a thin plate rotatable around a shaft 75a is provided on the right side of the film exposure portion 13 and the lever 75 is actuated clockwise by a spring 76. In order to ensure the actuating force of the spring 76, a pin 97 is fixed in the body. Both edges of the film F are regulated by pressing plate contacts 80 projected from the main body surface 100 and rails 81 are also projected from the main body surface 100. The height of the pressing plate contacts 80 is set larger than that of the rails 81 by a value slightly larger than the thickness of the film F. The lever 75 has an end surface 75c contacting a right end surface 81a of the upper rail 81 and the rotation of the lever 75 is limited by the contact. The lever 75 has a portion 75b having a shape covering obliquely the right lower area of the picture frame and this portion 75b has an edge 75e cut as shown in FIG. 9.

The lead Fa of the film F first contacts the surface of the obliquely cut portion of the lever 75 and thus it is prevented from curling toward the lens. More specifically, the film is raised by the surfaces 75b and 75e of the obliquely cut portion and it is put on the lever 75 without curling inside the wall 13a defining the picture frame on the side of the spool chamber 14, whereby it is fed to the spool chamber 14.

As shown in FIG. 7B, after the elongate portion of the film F has passed, the portion Fb having the larger width contacts the bent portion 75d of the lever 75 and then the lever 75 is rotated counterclockwise by the film F. On this occasion, the surface 75b of the obliquely cut portion of the lever 75 is entirely moved out of the film exposure portion 13 and this condition is maintained while the film F passes. Consequently, no inconvenience occurs in photographing through the exposure portion.

FIG. 10 is a control circuit diagram for controlling the operation mechanism of the camera according to the embodiment of the invention.

Referring to FIG. 10, the structure will be described.

The operation of the whole body of the camera is controlled by a microcomputer COM. The microcomputer COM is connected with the below described circuits and devices.

More specifically, the microcomputer COM is connected with: a film information reading circuit FD for reading information of the film sensitivity and so on of the film patrone P; a light measuring circuit ML for measuring luminance of an object; an auto focus control circuit AF including a distance measuring device for measuring a distance to the object and a lens drive device for driving the taking lens 2 based on the information of the measured distance; a display device DA for displaying various conditions of the camera CA; a flash device FC including a xenon tube, for emitting flashlight; an exposure control device EC for driving the aperture and the shutter in photographing; a motor control circuit MD for controlling the motor 21; circuits (Tr, R1, R2) for driving the magnet 68; reset circuits (R3, C) for resetting the power battery E and the microcomputer COM; a quartz oscillator X for applying a clock signal to the microcomputer COM; and switches Sl, Ss, S1 to S7. The switch Sl is a switch for detecting whether the film patrone P exists in the patrone chamber 6.

If the film patrone P exists in the chamber 6, the film patrone P presses the pin 17 to contact the contact pieces 18 and 19 each other, as shown in FIG. 4, whereby the switch Sl is turned on. If the film patrone P does not exist, the pin 17 is pushed upward by the contact piece 18 and the contact pieces 18 and 19 are separated from each other to turn off the switch Sl. The switch Ss is the above mentioned lock switch. It is on with the cover 7 being locked and off with the cover 7 being not locked. The switch S1 is a switch which is closed by depression at the first level of a shutter release button of a two-level depression type. The switch S2 is a switch which is closed by further depression of the shutter release button from the first level to the second level. The switch S3 is a film detection switch provided near the feed opening 6a of the patrone chamber 6 as shown in FIG. 1 and it is used to determine whether the film F comes out of the feed opening 6a.

If the film F comes out of the patrone chamber 6, the pin 47 is pressed by the film F to cause the contact pieces 48 and 49 to contact each other, whereby the switch S3 is turned on. If the film F does not come out of the patrone chamber 6, the contact pieces 48 and 49 are separated from each other and the switch S3 is off. The switch S4 turns on and off repeatedly by movement of the film F to generate pulses as described above. It generates a prescribed number of pulses when the film F moves for one frame. The switch S5 includes a roller 42a provided rotatable at the top end of the above mentioned guide lever 42 and a spool 41. The roller 42a, the guide lever 42 and the spool 41 are made of the same conductive material.

If the film F does not exist between the spool 41 and the guide lever 42, the spool 41 and the guide lever 42 contact each other to turn on the switch S5.

If the film F exists therebetween, the spool 41 and the guide lever 42 do not contact each other and the switch S5 is off. Thus, by means of this switch S5, it can be determined whether or not the film F reaches the spool 41. The switch S6 is a switch operated when the user wants to rewind the film F halfway without using the film until the last frame. This switch S6 corresponds to the switch SW in FIG. 2 and it is turned on when the user operates it. The switch S7 is used if the operator intends to remain the lead of the film out of the film patrone in rewinding of the film.

In the following, the operation of the camera according to the embodiment of the invention will be described.

A. Initial setting operation

Loading of the film patrone in the camera will be described.

As shown in FIG. 2, the cover 7 of the patrone chamber is opened and the film patrone P is put into the patrone chamber with the projecting patrone shaft Pa entering the chamber at first. On this occasion, the film drawing portion Pb of the film patrone P may be in any position. When the film patrone P is to be loaded, the top end 54a of the film information reading member 54, the top end 56b of the patrone support lever 56 and the top end 61b of the patrone pressing lever 61 are positioned outside the patrone chamber 6 so that those portions may not interfere with the loading of the film patrone P.

Figure 11A:
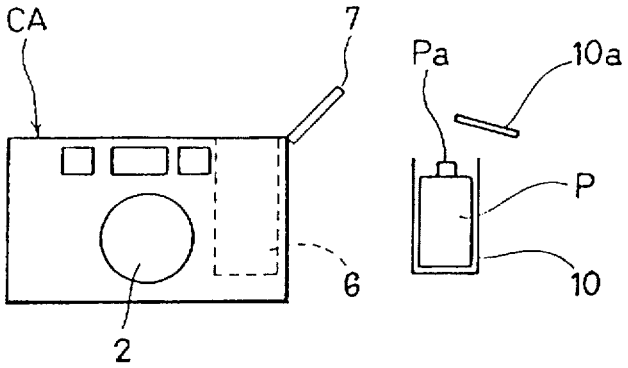
FIGS. 11A to 11C are schematic views showing film patrone loading operation according to the embodiment of the invention.
Figure 11B:
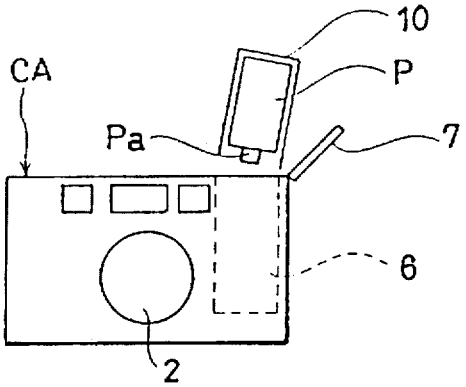

In this camera CA, the user can load the film without directly touching the film patrone P by using a method other than the above described method. The loading operation according to this method will be shown in FIGS. 11A to 11C. As shown in FIG. 11A, the film patrone P is contained in a patrone case 10 generally in a manner in which the projecting patrone shaft Pa exists on the side of a cover 10a.

Figure 11C:
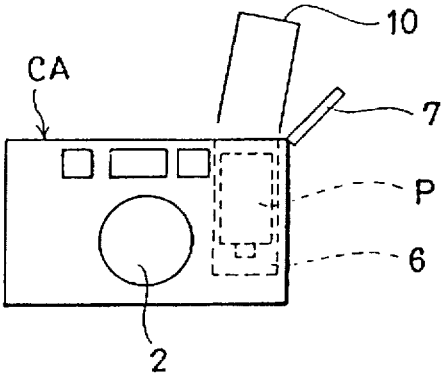

In loading the film, the user opens the cover 7 of the camera CA, removes the cover 10a of the patrone case 10 and reverses and positions the patrone case 10 over the opening of the patrone chamber 6. As a result, as shown in FIG. 11C, the film patrone P is inserted into the patrone chamber 6. In either of the above described methods, the film patrone P is put in the patrone chamber 6 when the cover 7 is closed.

Referring to FIG. 4, if the phase of the fork 37 does not coincide with the phase of the key Pd of the patrone shaft Pa, the fork 37 moves downward by the patrone shaft Pa in opposition to the force of the spring 38. Since the guide member 70 provided substantially at the center of the cover 7 has the conical surface serving as the portion of engagement with the patrone shaft Pc, the guide member 70 smoothly engages with the patrone shaft Pc no matter what position the film feed opening Pb of the film patrone P exists.

If the film patrone P is inserted into the camera upside down (namely, with the non-projecting patrone shaft Pc entering the patrone chamber at first), the projecting patrone shaft Pa becomes an obstacle and the cover 7 cannot be closed according to this embodiment. Accordingly, the user immediately detects such condition and further abnormality does not occur.

When the cover 7 is closed, the pin 17 in the lower portion of the patrone chamber 6 is pressed by the film patrone P to cause the contact pieces 18 and 19 to contact each other, whereby the switch Sl is closed.

Figure 12A:
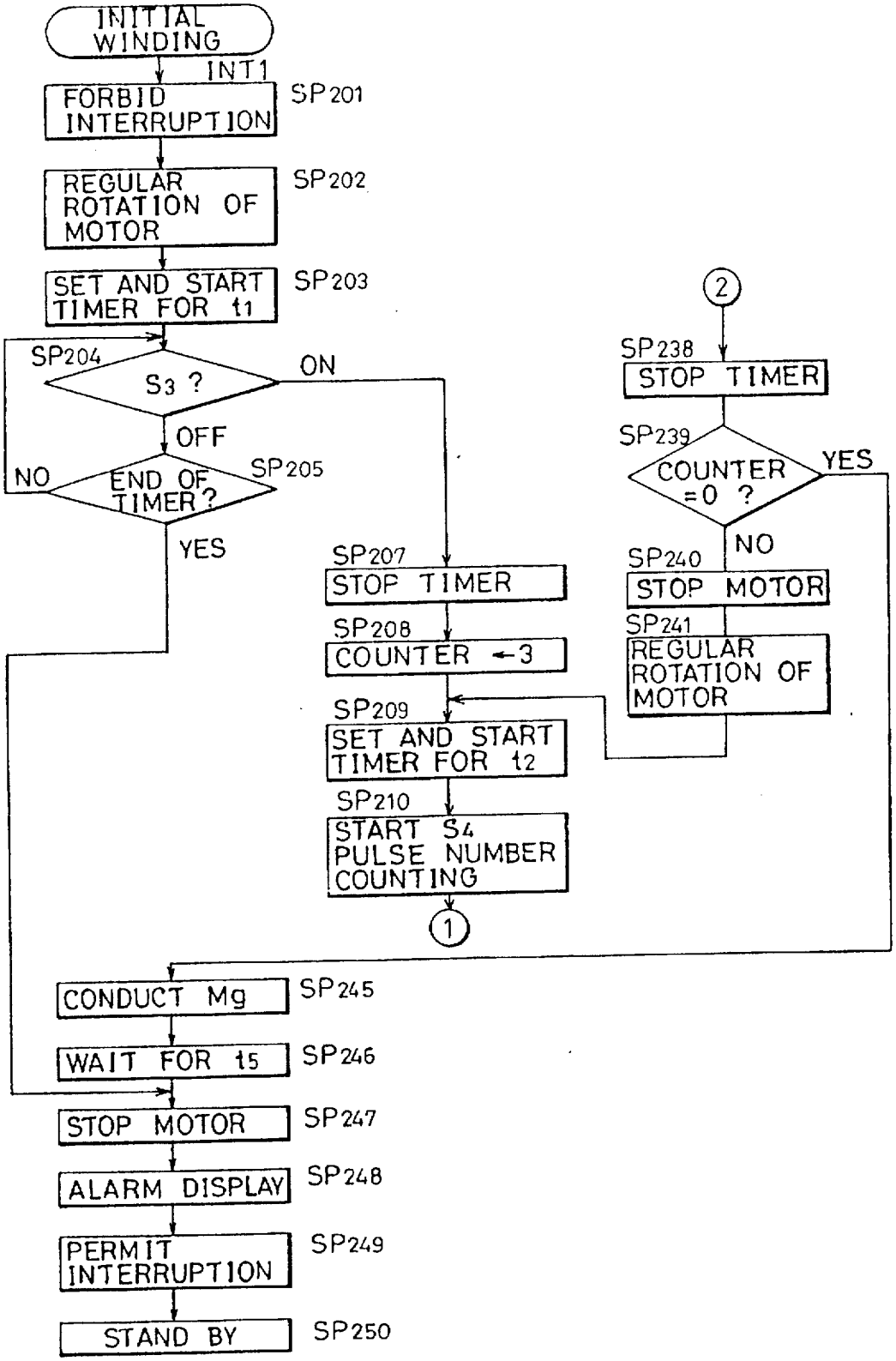
FIGS. 12A and 12B are flow charts showing initial winding operation according to the embodiment of the invention.
Figure 12B:
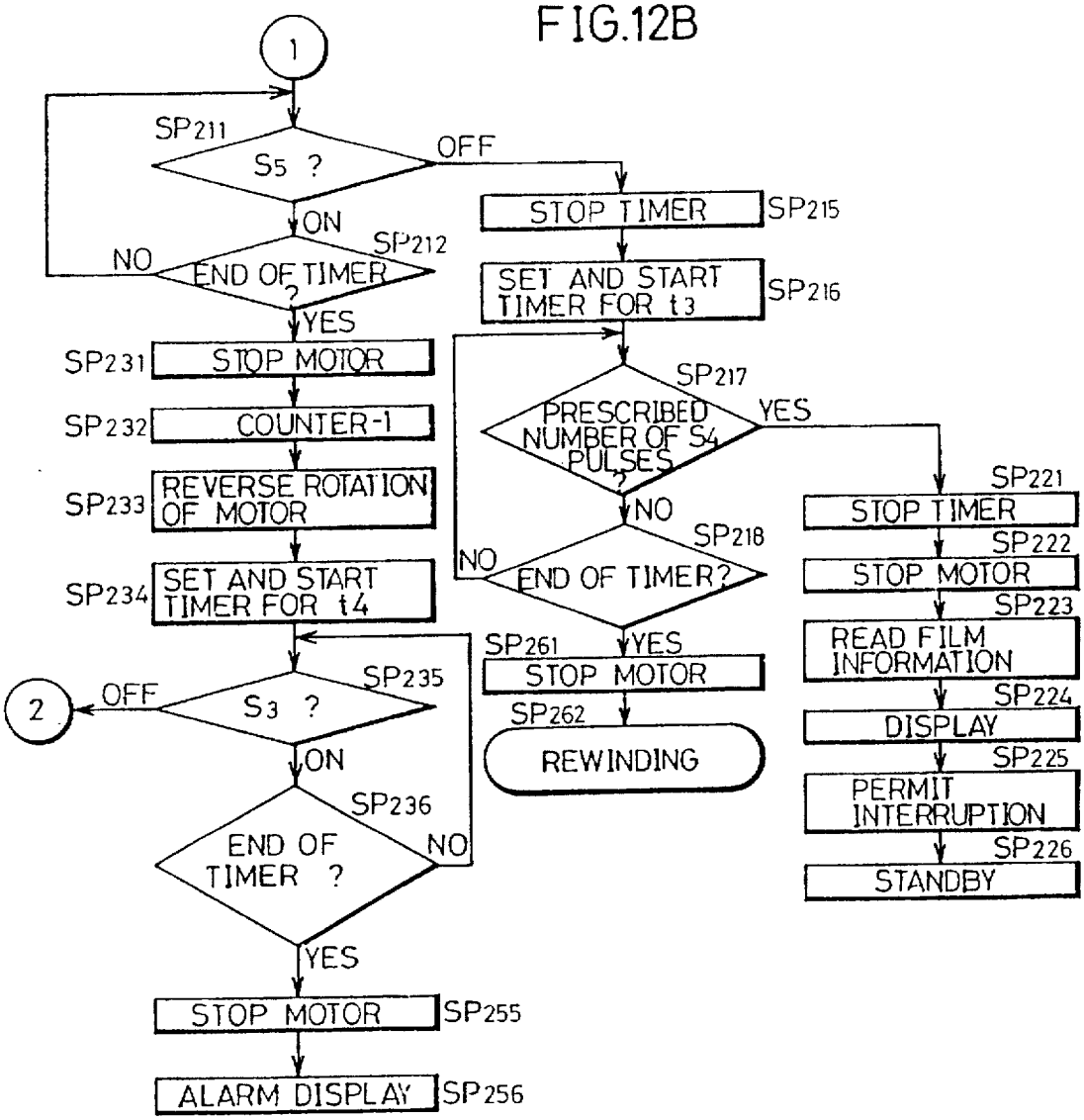

When the lock lever 8 is rotated to the lock position, the switch Ss is closed. As a result, as shown in FIG. 10 an OR circuit OR1 connected to the switches Sl and Ss output a low (L) level signal. Then, a one-shot pulse circuit OS connected to the OR circuit ORI outputs a high (H) level signal for a prescribed period. As a result, an L level signal is applied to an interruption terminal INT1 of the microcomputer COM from an inverter INV connected to the circuit OS, whereby interruption operation at the terminal INT1 is carried out B. Initial winding operation In the following, winding operation in the initial state will be described with reference to the flow charts in FIGS. 12A and 12B.

First, in step SP201, interruption for other operation is forbidden, the motor 21 is rotated in the regular direction in step SP202, and a timer for time t1 is set to start counting in step SP203.

When the motor 21 is rotated in the regular direction in the above mentioned step S202, the gears 23 and 27 are rotated counterclockwise through the reduction gear system 22. Thus, since the gear 31 engaging with the gear 27 rotates clockwise, the planetary gears 25, 29 and 33 engage with the spool drive gear 26, the sprocket drive gear 30 and the gear 34, respectively, whereby the spool drive gear 26 and the sprocket derive gear 30 rotate counterclockwise. Since the gear 34 rotates clockwise, the fork drive gear 36 rotates counterclockwise. Accordingly, the spool 41, the film feed sprocket 40 and the fork 37 all rotate counterclockwise.

When the fork 37 rotates counterclockwise and the phase thereof coincides with the phase of the key Pd of the patrone shaft Pc, the fork 37 is raised by the spring 38 to engage with the patrone shaft Pc. In consequence, the patrone shaft Pc rotates in the direction loosening the winding of the film F. Since the film F has a friction resistance with a plush in the film drawing, portion Pb of the film patrone P, the film F is loosened in the film patrone P by the rotation of the patrone shaft Pc and it is in close contact with the inner wall of the film patrone P. In that state, the patrone shaft Pc, the film F and the film patrone P rotate together. The lead Fa of the film F elastically slides and rotates on the inner wall of the patrone chamber 6 by its elasticity and it is led on the guide surface 6C shown in FIG. 1 to reach the film feed opening 6a (as shown in FIGS. 3B).

It is determined in step SP204 whether the switch S3 is on or off. If it is off, the program proceeds to step SP205 to determine whether the timer started in step SP203 comes to an end or not. If it does not come to the end, the program returns to step SP204 and the above mentioned procedures are repeated.

When the film F comes out of the film feed opening 6a, the switch S3 is turned on and the program proceeds to step SP207. If the switch S3 is not turned on during the time t1, the program proceeds to step SP247. The time t1 is normally set to a time sufficiently longer than the period from the start of the rotation of the motor 21 to the turn-on of the switch S3. Therefore, if the switch S3 is not turned on within the time t1, it means that some abnormality occurs and obstructs the feed of the film F from the film feed opening 6a. In that case, the motor 21 is stopped in step SP247 and an alarm display of abnormality is given on the display device DS in step SP248. Then, in step SP249, interruption for other operation is permitted and a standby state is set in step SP250.

When the film F comes out of the film feed opening 6a to turn on the switch S3, the motor 21 rotates continuously. The timer for the time t1 is stopped in step SP207 and the number "3" is set in the counter in step SP208. Then, in step SP209, the timer for the time t2 is set and it starts counting. The film lead Fa reaches the film feed sprocket 40 and the film feed sprocket 40 engages with the perforations Fc of the film F, whereby the film F is fed to the spool chamber 14 by the film feed sprocket 40. Since the lead portion of the film F has a narrow width, the follower sprockets 50 and 51 do not rotate for a while after the film F comes out of the film feed opening 6a.

When the film F is further fed, the follower sprockets 50 and 51 engage with the perforations Fd of the film F, whereby the follower sprocket 50 rotates counterclockwise and the follower sprocket 51 rotates clockwise. According to the rotation of the follower sprocket 50, the switch S4 is turned on and off repeatedly by means of the substrate 58 and the contact piece 59, thereby generating prescribed pulses. Counting of those pulses is started in step SP210. In step SP211, it is determined whether the switch S5 is on or off. More specifically, it is determined whether the lead Fa of the film F reaches the spool 14 and the roller 42a of the film guide lever 42. If the switch S5 is on in step SP211, the program proceeds to step SP212 to determine whether the timer for the time t2 started in step SP209 comes to an end or not. If it does not come to the end, the program returns to step SP211 and the above mentioned procedures are repeated.

In the meantime, as shown in FIG. 1, the counterclockwise rotation of the follower sprocket 50 causes the drive member 55 to rotate counterclockwise through the spring 57. The drive lever 52 is rotated clockwise through the pin 55a and the top end 56b of the patrone support lever 56 enters the patrone chamber 6 through the pin 52c. The protruding portion 55b of the drive member 55 contacts the fixed pin 95 of the camera body 1, whereby the rotation of the drive member 55 is stopped. As a result, the movement of the drive lever 52 and that of the patrone support lever 56 are also stopped. Even if the rotation of the drive member 55 is stopped, the follower sprocket 50 continues to be rotated by the passage of the film F since the follower sprocket 50 is slipped by the spring 57 and is rotatable.

The top end 56b of the patrone support lever 56 contacts the patrone P closely to the film drawing portion Pb and even if the film F is pulled by the film feed sprocket 40 or the spool 41, the lever 56 prevents the patrone P from moving toward the film feed opening 6a and thus maintains the patrone P in the proper position. By the counterclockwise rotation of the drive member 55, the film information reading member base 53, the rotation of which is regulated by the protruding portion 55b, rotates counterclockwise from the position shown by the chain lines in the figure by means of the spring (not shown) and the film information reading member 54 rotates together, with the result that the top end 54a thereof contacts the patrone P.

The patrone P continues to rotate for a while until the film drawing portion Pb of the patrone P comes near the film feed opening 6a (the position shown in FIG. 1) even after the film F comes out of the film feed opening 6a and starts to be fed by the film feed sprocket 40, and at the same time, the patrone support lever 56 and the film information reading member 54 enter the patrone chamber 6. Therefore, if the patrone support lever 56 and the film information reading member 54 enter the patrone chamber 6 before the lead Fa of the film F comes out of the film feed opening 6a, the lead Fa of the film F might be caught by the lever 56 and so on and could not be rotated. In order to prevent this, the lever 56 and the member 54 are set to move only after the lead Fa of the film F comes out of the film feed opening 6a. Since the lead Fa of the film F has been already out of the film feed opening 6a, there is no obstruction to the film feeding.

The length of the portion of the film F outside the patrone P is normally a length which is not sufficiently equal to one turn around the patrone P. Accordingly, if the lead Fa of the film F comes out of the film feed opening 6a, the film drawing portion Pb of the patrone P does not contact the patrone support lever 56 until the condition shown in FIG. 1 is set. The film information reading member S4 rotates clockwise in opposition to the actuating force even if it contacts the film drawing portion Pb. As a result, there is no effect on the rotation of the patrone P. When the film drawing portion Pb of the patrone P attains the condition shown in FIG. 1, the patrone P no longer rotates. At this time, the fork 37 causes the film F to loosen its winding but since the speed for feeding the film F by the film feed sprocket 40 is faster than the speed for loosening the winding of the film F by the fork 37, the initial loosening of the wound film F is gradually diminished as the drive of the film F proceeds and finally there is no loosening.

The film F wound on the patrone shaft is forced to be released and as to the gear 34 engaging with the fork gear 36, the speed for rotating the gear 34 by the forced release of the film F wound on the patrone shaft is faster than the speed for rotating the gear 34 by the planetary gear 33. Consequently, the planetary gear 33 does not engage with the gear 34 and it can absorb the difference of the speeds. While the patrone B is in the condition shown in FIG. 1, the top end 54a of the film information reading member 54 contacts the position of the pattern having the information of the film patrone P.

On the other hand, the clockwise rotation of the follower sprocket 51 causes the gear 60 engaging with the gear 51a to rotate counterclockwise. The operation after this is led to two cases in accordance with the condition in that the lead portion of the film F previously used remains in rewinding of the film or that the lead portion of the film F has been entirely rewound in the film patrone P. (As will be describe afterwards, the method of rewinding of the film can be selected from the above two cases in the structure of this embodiment.)

In the first case, the magnets 68 is conducted and the lever 65 and the charge lever 66 are rotated counterclockwise (as shown by the chain lines in FIG. 1). Even if the cover 7 is closed, the patrone release lever 62 is also rotated counterclockwise and the top end 61b of the patrone pressing lever 61 is outside the patrone chamber 6 (as shown by the chain lines).

When the cover 7 is opened for exchange of films, the top end 61b of the patrone pressing lever 61 is already outside the patrone chamber 6. The lever 65 and the charge lever 66 are in the condition shown by the chain lines in FIG. 1. Accordingly, if the gear 60 rotates counterclockwise, the protruding portion 60a provided in the upper portion of the gear 60 presses the top end 66a of the charge lever 66 to rotate clockwise the charge lever 66 and the lever 65 together around the shaft 65a and to cause the absorption piece 67 of the other end to be absorbed by the magnet 68, whereby the respective components are set in the condition shown by the solid lines in FIG. 1. Since the cover 7 is closed, the shaft 63 is lowered in opposition to the spring 64 and the patrone release lever 62 can be rotated clockwise by the actuating force. Thus, the patrone pressing lever 61 rotates counterclockwise and the top end 61b thereof enters the patrone chamber 6. At this time, even if the film drawing portion Pb of the patrone P rotates, the lever 61 can rotate clockwise in opposition to the actuating force. Since the actuating force of the patrone pressing lever 61 is set very light, it does not cause any inconvenience to the rotation of the patrone P.

In the second case, the magnet 68 is not conducted and the absorption piece 67 is maintained absorbed on the magnet 68. Accordingly, the lever 65 and the charge lever 66 are maintained in the condition shown by the solid lines in FIG. 1.

When the cover 7 is opened for exchange of films, as shown in FIG. 5, the shaft 63 is raised upward by the spring 64 to rotate the patrone release lever 62 counterclockwise on the tapered surface 63b, whereby the top end 61b of the patrone pressing lever 61 is moved out of the patrone chamber 6. As a result, the lever 61 does not cause any obstruction to exchange of film patrones P.

The lever 65 and the charge lever 66 are already in the condition shown by the solid lines in FIG. 1. Accordingly, when the cover 7 is closed, the top end 61b of the patrone pressing lever 61 enters the patrone chamber 6. The vertical position of the patrone pressing lever 61 is located higher than the position of the narrow lead portion of the film F. Accordingly, the lever 61 does not touch the lead Fa of the film F and does not cause any inconvenience to the rotation of the patrone P as described above. Thus, no trouble occurs when the top end 61b of the patrone pressing lever 61 enters the patrone chamber 6 by the closing of the cover 7.

In the previous rewinding, the top end 61b of the patrone pressing lever 61 may come out of the patrone chamber 6 by conduction of the magnet 68 after the end of rewinding or in cooperation with the lock switch which is turned off in response to the release of lock of the cover 7.

The lead Fa of the film F reaches the film exposure portion 13 and contacts the portion 75b , that is, obliquely cut surface, of the lever 75 as shown in FIG. 7A. Even if the film F curls toward the taking lens 2, the film F is raised by the obliquely cut surface 75b of the lever 75 and it is put over the lever 75 and slides on it smoothly. As shown in FIG. 7B, when the film F is further fed, the bent portion 75d of the lever 75 is pushed by the portion Fb of the larger width of the film F to rotate the lever 75 counterclockwise. As a result, the obliquely cut portion 75b of the lever 75 is entirely moved out of the film exposure portion 13 and this condition is maintained. The lead Fa of the film F passes through the film exposure portion 13 and it is guided by the film guide lever 42 to the spool 41.

When the lead Fa of the film F is introduced between the roller 42a and the spool 41, the switch S5 is turned off. Accordingly, the program proceeds to step SP215 from step SP211 to stop the timer set to the time t2. If the switch S5 is not turned off within the time t2, the program proceeds to step SP231 from step SP212 to stop the motor 21. The time t2 is normally set to a period sufficient to turn off the switch S5 after the turn-on of the switch S3. Consequently, if the switch S5 is not turned off within the time t2, it may be supposed that the film F is caught halfway (particularly in the film exposure portion 13) or trouble occurs in the drive system.

If the film F is caught halfway, it is necessary to rewind the film F to some extent (until the switch S3 is turned off) and to wind the film F again and then the film F can smoothly move. For this purpose, such rewinding and winding operations are repeated several times. More specifically stated, after the motor is temporarily stopped in step SP231, 1 is subtracted in step SP232 from the count value 3 set in step SP208 and the motor 21 is conducted to rotate reversely in step SP233. Then, the film F is rewound into the patrone P and moves in the opposite direction. The timer for the time t4 is set to start counting in step SP234 and it is determined in step SP235 whether the switch S3 is off or not.

If the switch S3 is on, it is determined in step SP236 whether the timer for the time t4 comes to an end or not. If it does not come to the end, the program returns to step SP235 to repeat the above mentioned procedures. The time t4 is normally set sufficiently longer than the time required for the film F approaching the spool 41 (before the switch S5 is turned off) until the switch S3 is turned off. Accordingly, if the film F is caught in winding as described above, the switch S3 is turned off within the time t4 by the rewinding of the film F and the program proceeds to step SP238 to stop the timer for the time t4. If some trouble occurs in the drive system in the winding or rewinding of the film F caused by occurrence of trouble in the winding drive system, the switch S3 is not turned off during the time t4 and the program proceeds to step SP255 to stop the motor 21. Then, in step SP256, a trouble alarm display (shown in DS in FIG. 1) is given to announce occurrence of abnormality and photographing operation and related operation are rendered unavailable until recovery of the trouble.

On the other hand, if the switch S3 is turned off in step SP235 and the program proceeds to step SP238, it is determined in step SP239 whether the count value is 0 or not as a result of the subtraction of 1 from the count value in step SP232. If it is not 0, the program proceeds to step SP240 to stop the motor 21 and, after that, in step SP241, the motor 21 is rotated again in the regular direction to advance the film F in the winding direction. The program returns to step SP209 and the above mentioned procedures are repeated until the switch S5 is turned off. In this case, the number of repetitions is, at most, 3 which is set in step SP208, but it is not limited thereto. If the switch SS is not turned off after the procedures are repeated three times, the count value is set to 0 in step SP239 and the program proceeds to step SP245. Then the magnet 68 is conducted and the rewinding operation continues.

The conduction of the magnet 68 is effected for the purpose of rewinding the film with the lead portion thereof being left, as described afterwards. Then, there is a wait for the time t5 in step SP246 and, after that, in step SP247, the motor 21 is stopped, so that an alarm display is given in step SP248 to indicate that the loading of the film F has failed. In step SP249, interruption for other operation is permitted and a standby state is set in step SP250.

When the switch S5 is turned off and the program proceeds to step SP215 from step SP211, the timer for the time t3 is set in step SP216 to start counting. It is determined in step SP217 whether the number of pulses of the switch S4 is a prescribed number or not. If it is not the prescribed number, the program proceeds to step SP218. It is determined whether the timer for the time t3 comes to an end or not. If it does not come to the end, the program returns to step SP217 to repeat the above mentioned procedures. The prescribed number of pulses of the switch S4 is set to a value required for feeding of the non-exposed portion of the film to the film exposure portion 13 in initial winding operation, and the time t3 is set to a period sufficiently long to feed the film to the film exposure portion 13 after the turn-off of the switch S5.

If it is determined in step SP218 that the timer comes to the end, this means that the film is so short that the non-exposed portion can not reach the film exposure portion 13 or that some trouble occurs in the drive system. Consequently, the program proceeds to step SP261 to stop the motor 21 and then the program proceeds to a rewinding routine described afterwards.

When the number of pulses of the switch S4 attains the prescribed number, the program proceeds to step SP221 to stop the timer set to the time t3 and, in step SP222, the motor 21 is stopped. In step SP223, the information of the film patrone P is read through the film information reading circuit FD by means of the film information reading member 54. In step SP224, the read value of the information is displayed and the fact that the initial winding operation has been done successfully, as well as data is displayed on the display device DS. In step SP225, interruption for other operation is permitted and a standby state is set in step SP226. Thus, the initial winding operation is completed.

The film F is wound and tightened on the spool 41 and it is fed according to the rotation of the spool 41. The feeding speed of the film F by the spool 41 at this time is faster than the speed by which it is fed by the film feed sprocket 40. Accordingly, the planetary gear 29 shown in FIG. 3A does not engage with the sprocket drive gear 30 and it can absorb the difference of the speeds.

C. Photographing and winding operation

Figure 13:
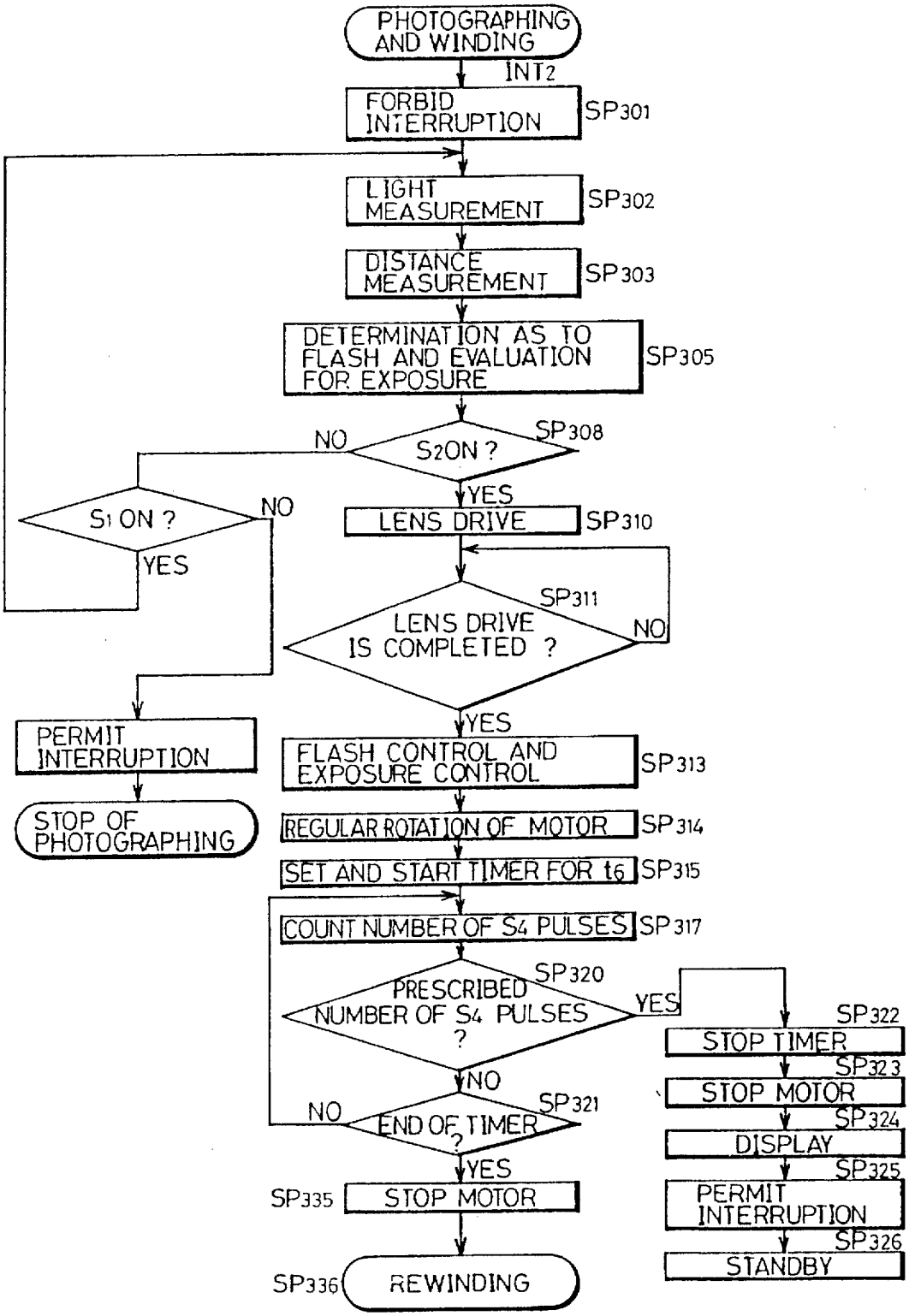
FIG. 13 is a flow chart showing photographing and winding operations according to the embodiment of the invention.

The operation will be described with reference to the flow chart in FIG. 13.

When the switch S1 is closed by the depression of the shutter release button at the first level, an interruption signal is applied to the interruption terminal INT2 as shown in FIG. 10. Then, the interruption at the terminal INT2 is executed and interruption for other operation is forbidden in step SP301. Then, in step SP302, the luminance of the object is measured by the light measuring circuit ML and, in step SP303, the distance to the object is measured by the distance measuring device of the auto focus control circuit AF. In step SP305, based on the results of measurements in steps SP302 and SP303 and the film information obtained by the above described initial winding operation, whether or not the flashlight is to be emitted is determined and data for exposure control is evaluated. Then, in step SP308, it is determined whether the switch S2 is closed or not by the depression of the shutter release button at the second level.

If it is determined that the shutter release button is not depressed to the second level, the program proceeds to step SP330. It is determined in this step whether the shutter release button is kept depressed at the first level or not.

If it is determined that the shutter release button is kept at the first level, the program returns to step SP302. Thus, since it is determined in this case that the camera is waiting in a state prepared for photographing, the above mentioned procedures are repeated until it is determined in step SP308 that the shutter release button is depressed to the second level. If it determined in the above mentioned step SP330 that the shutter release button is not depressed to the first level, it is determined that the operation is stopped. Then, the program proceeds to step SP331 to permit interruption for other operation and, in step SP332, the photographing operation is interrupted.

If it is determined in the above mentioned step SP308 that the shutter release button is depressed to the second level, the program proceeds to step SP310 to move the taking lens 2 to a position according to the distance to the object through the auto focus control circuit AF. In step SP311, it is determined whether the drive of the taking lens 2 is terminated or not.

If it is determined that the drive of the taking lens is not terminated, there is a wait until the drive of the taking lens 2 is completed.

If it is determined that the drive of the taking lens 2 is completed, the program proceeds to step SP313, where exposure operation (photographing operation) is carried out by the shutter 12 through the above mentioned exposure control device EC and flashlight is emitted as required by operation of the flash device FC.

After the exposure operation, the motor 21 is rotated in the regular direction in step SP314 and, as described above in connection with the initial winding operation, the film F is wound on the spool 41. On this occasion, the shutter 12 is charged by a shutter charge mechanism not shown. In step SP315, the timer is set to the time t6, whereby it starts operation and, in step SP317, it counts the number of pulses of the switch S4. In step SP320, it is determined whether the number of pulses of the switch S4 attains the prescribed number or not.

If it is not the prescribed number, the program proceeds to step SP321 to determine whether the timer comes to an end or not. If it does not come to the end, the program returns to step SP317 to repeat the above mentioned procedures. The prescribed number of pulses of the switch S4 corresponds to an amount of one frame of the film F fed and the time t6 is normally set sufficiently longer than the time required for feeding the film F by one frame. When it is determined in step SP320 that the number of pulses from the switch S4 attains the prescribed number, the program proceeds to step SP322. Then, the timer is stopped and, in step SP323, the motor 21 is stopped. In step SP324, the number of frames of the film photographed is displayed and interruption for other operation is permitted in step SP325, whereby the standby state is set in step SP326.

If one frame of the film is not sent within the time t6, this means that the last frame of the film F has passed and the film F cannot be further wound or that some trouble occurs in the drive system. Accordingly, the program proceeds to step SP335 from step SP321 to stop the motor 21 and then, in step SP336, the rewinding routine is executed.

D. Rewinding operation

Figure 14:
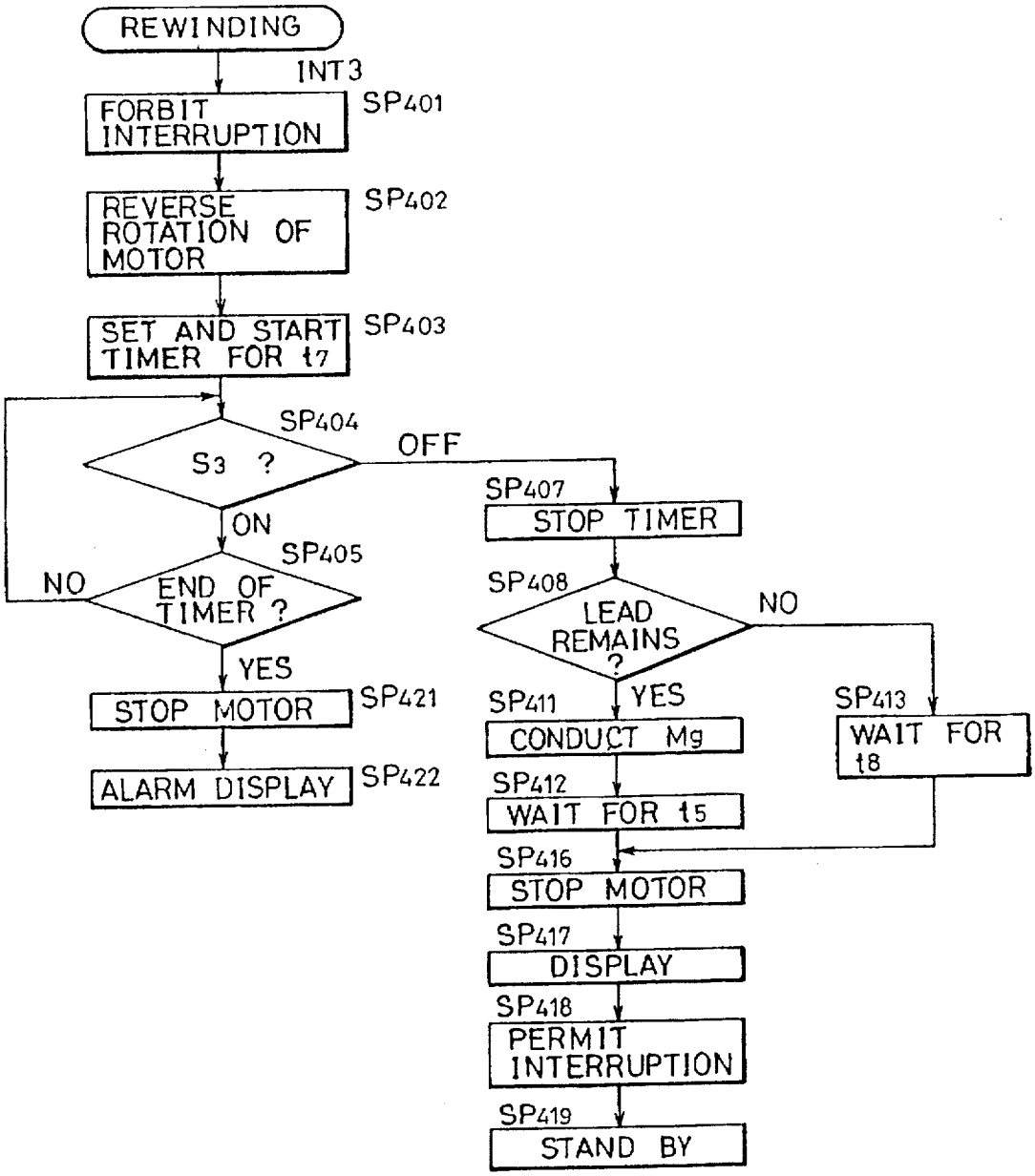
FIG. 14 is a flow chart showing rewinding operation according to the embodiment of the invention.

The rewinding operation will be described with reference to the flow chart in FIG. 14.

When the switch S6 is closed by operation of the user to rewind the film halfway without reaching the last frame in photographing, an interruption signal is inputted to the interruption terminal INT3 as shown in FIG. 10 and the interruption at the terminal INT3 is executed. Or when the film F is further fed after the last frame in winding as described above, the rewinding routine is executed. In step SP401, interruption for other operation is forbidden and, in step SP402, the motor 21 is rotated reversely. When the motor 21 is rotated reversely, the gears 23 and 27 shown in FIG. 3A both rotate clockwise through the reduction gear system 22 and the levers 24 and 28 also rotate clockwise on the shafts 23a and 27a, respectively. As a result, the planetary gears 25 and 29 move to positions not engaging with the spool drive gear 26 and the sprocket drive gear 30, respectively, to cancel the transmission of power to the spool 41 and the film feed sprocket 40.

In the meantime, since the gear 31 rotates counterclockwise by the clockwise rotation of the gear 27, the lever 32 rotates counterclockwise and the planetary gear 33 engages with the gear 35 to rotate the fork drive gear 36 clockwise. Then, the patrone shaft Pa is rotated clockwise by the fork 37. Although the film patrone P also tends to rotate clockwise, the film drawing portion Pb contacts the top end 61b of the patrone pressing lever 61. On this occasion, since the force received by the patrone pressing lever 61 is applied just in the direction of the shaft 61a, the patrone pressing lever 61 cannot rotate. As a result, the film patrone P cannot rotate. Thus, the clockwise rotation of the patrone shaft Pa enables the film F to be rewound into the patrone P. Conversely, if the patrone pressing lever 61 is outside the patrone chamber 6, the patrone P will rotate in most cases with the film F externally wound around the patrone p dependent on the diameter of the wound film on the patrone shaft, the friction force of the film drawing portion Pb of the patrone P with respect to the film and the friction force of the film F itself, and the film F will not enter the patrone F. In order to prevent such external winding of the film, the patrone pressing lever 61 is provided.

When the film F is rewound, the follower sprocket 50 rotates clockwise and the follower sprocket 51 rotates counterclockwise. When the follower sprocket 50 rotates clockwise, the drive member 55 rotates clockwise through the spring 57 as shown in FIGS. 1 and 4 to rotate the drive lever 52 counterclockwise through the pin 55a. Then, the patrone support lever 56 is moved rightward in FIG. 1 through the pin 52C and the top end 56b of the patrone support lever 56 is moved outside the patrone chamber 6. By the clockwise rotation of the drive member 55, the protruding portion 55b of the drive member 55 contacts the end surface 53b of the film information reading member base 53 and presses it, whereby the film information reading member 53 is rotated clockwise in opposition to the actuating force and the top end 54a of the film information reading member 54 is moved outside the patrone chamber 6. On this occasion, the actuating force of the spring 57 is set so that the follower sprocket 50 and the drive member 55 may not slide on each other. When the protruding portion of the drive member 55 contacts the fixed pin 96 of the body, the rotation of the drive member 55 is stopped and the follower sprocket 55 driven by the spring 57 slides thereon.

In the meantime, the counterclockwise rotation of the follower sprocket 51 causes the gear 60 to rotate clockwise through the gear 51a. Even if the protruding portion 60a of the gear 60 contacts and presses the top end 66a of the charge lever 66, the charge lever 66 rotates only counterclockwise around the shaft 65c in opposition to the spring 69 and the lever 65 does not move. Simultaneously with the rewinding of the film F, the film feed sprocket 40 and the spool 41 also rotate clockwise in FIG. 3A. However, since the planetary gears 29 and 25 have been moved away to the positions not engaging with the sprocket drive gears 30 and 26, respectively, there is no obstruction to the rotations of the sprocket 40 and the spool 41. Then, the film F is rewound smoothly.

When the motor 21 is rotated reversely in step SP402, the timer is set to the time t7 in step SP403 to start counting. It is determined in step SP404 whether the above mentioned film detection switch S3 is off or not. If it is on, the program proceeds to step SP405 to determine whether the timer comes to an end or not. If it does not come to the end, the program returns to step SP404 to repeat the above mentioned procedures. The time t7 is normally set sufficiently longer than the time required for rewinding the film F until the switch S3 is turned off. Consequently, if the switch S3 is not turned off within the time t7, it is considered that some abnormality occurs and the program proceeds to step SP421. Then, the motor 21 is stopped.

In step SP422, a trouble alarm display is given to announce occurrence of the abnormality and other operation is rendered unavailable until recovery of the trouble. If it is determined in step SP404 that the switch S3 is turned off, the program proceeds to step SP407 to stop the timer. In step SP408, it is determined whether the rewinding operation should be stopped with the lead portion of the film being left outside the patrone P. This determination is made by detection that the operation button (S7) or the like is pressed when the user desires to take out the film F with the lead portion thereof being left outside. If it is determined that the lead portion of the film is to be left outside, the program proceeds to step SP411 to conduct the magnet 68. On this occasion, the absorption force of the magnet 68 applied to the absorption piece 67 attached in the top end of the lever 65 as shown in FIG. 1 disappears and the lever 65 rotates counterclockwise around the shaft 65a by the force caused thereby. As a result, the end surface 65d pushes the top end 62b of the patrone release lever 62 to cause the patrone release lever 62 to rotate counterclockwise around the shaft 62a in opposition to the actuating force.

The top end 62 of the patrone release lever 62 pushes the end surface 61c of the patrone pressing lever 61 to rotate the patrone pressing lever 61 clockwise around the shaft 61a in opposition to the actuating force. As a result, the top end 616 of the patrone pressing lever 61 is moved outside the patrone chamber 6. Accordingly, there is no obstruction to the rotation of the patrone P and the patrone P rotates by itself clockwise. The film F is not further rewound into the patrone P after the patrone pressing lever 61 has been moved away and according to the rotation of the film drawing portion Pb of the patrone P, the film F is taken into the patrone chamber 6 and then the lead portion Fa thereof is introduced into the patrone chamber 6.

In step SP412, there is a wait for the time t5 and, in step SP416, the motor 21 is stopped. This is because it takes time for the film lead portion Fa to be entirely taken in the patrone chamber 6 after the conduction of the magnet 68. If the time t5 has passed, the film lead portion Fa exists in the patrone chamber 6 in the same condition as the condition where the patrone P was set in loading of the film.

If it is determined in step SP408 that the film lead portion is not to be left, the program proceeds to step SP413, where there is a wait for the time t8. Then, the program proceeds to step SP416 to stop the motor 21. In this case, the film lead portion Fa needs to be entirely rewound in the patrone P which is kept fixed. Thus, the film lead portion Fa is reliably taken back into the patrone P within the time t8. Subsequently, a display is given in step SP417 to indicate that the rewinding operation is terminated and to instruct the user to take out the film patrone P. In step SP418, interruption for other operation is permitted and the standby state is set in step SP419.

Figure 15:
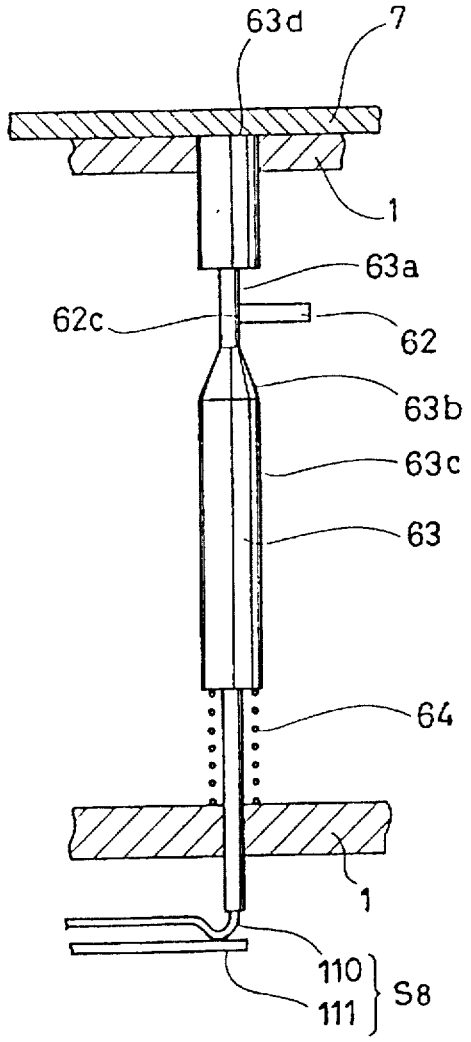
FIG. 15 is a view of another embodiment of the invention, in which a charge shaft is provided with a switch S8.

In the above described embodiment, the magnet is used to stop rewinding with the lead portion of the film being left. However, it is also possible to stop rewinding with the film lead portion left without using such a magnet in order to reduce the cost and the space. In this case, the motor 21 is stopped immediately when the switch S3 is turned on, and a display is given to indicate an end of rewinding in the above mentioned state, whereby the cover 7 is ready to be opened. A switch cooperating with the cover 7 is required for determining whether the cover 7 is opened or not. For example, as shown in another embodiment in FIG. 15, it is only necessary to provide a switch S8 including contact pieces 110 and 111, which is turned off when the shaft 63 is completely raised and is turned on when the shaft is lowered by the cover 7.

When the switch S8 is turned off, it is determined that the cover 7 is opened and then the motor 21 is rotated again reversely for a prescribed period. Since the top end 61b of the patrone pressing lever 61 is moved outside the patrone chamber 6 as described above by the opening of the cover 7, the patrone P can rotate clockwise with the film lead portion being left.

As described in the foregoing, according to the present invention, control operation is performed to stop the film feed means when the fed film does not pass through the film exposure portion. Thus, it is possible to prevent damage to the film and the film loading device and the film can be loaded with high reliability.

In addition, as described above, if the fed film does not pass through the film exposure portion within a prescribed time, the film is temporarily rewound and is fed again, which makes it possible to reduce errors in film loading. Thus, the camera according to the present invention is easy to use.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. [A camera] *An apparatus for use with a film* which feeds a film from a patrone chamber to a spool chamber, comprising:

[a film exposure portion] *an aperture which passes a light therethrough* having a first edge at the patrone chamber side and a second edge at the spool chamber side for forming an opening to [expose a film to] *pass the* light;

film feed means for feeding the film from the patrone chamber to the spool chamber through said [film exposure portion] *aperture*;

first detection means provided on the spool chamber side of the second edge for detecting whether or not a lead of the film which is fed to the spool chamber by said film feed means successfully passes the second edge in the direction of the spool chamber from the patrone chamber; and control means for controlling operation of said film feed means in response to an output of said first detection means.

2. [A camera] *An apparatus for use with a film* which feeds a film from a patrone chamber to a spool chamber, comprising:

[a film exposure portion] *an aperture which passes a light therethrough* having a first edge at the patrone chamber side and a second edge at the spool chamber side for forming an opening to [expose a film to] *pass the* light;

film feed means for feeding the film from the patrone chamber to the spool chamber through said [film exposure portion] *aperture*;

first detection means provided on the spool chamber side of the second edge for detecting whether or not a lead of the film fed by said feed means successfully passes the second edge;

control means for controlling operation of said film feed means in response to an output of said first detection means; and rewinding means for rewinding the film toward the patrone chamber, wherein said control means operates said rewinding means when said first detection means fails to detect a passage of the lead of the film beyond the second edge after lapse of a prescribed time from a start of operation of said film feed means.

3. [A camera] *An apparatus for use with a film* which feeds a film from a film feed opening of a patrone chamber, comprising:

film feed means for feeding said film from said film feed opening to a spool chamber through [a film exposure portion] *an aperture which passes a light therethrough*;

first detection means for detecting whether or not said fed film passes through said [film exposure portion] *aperture*;

second detection means for detecting that a lead of said film exists between said film feed opening and said [film exposure portion] *aperture*;

rewinding means for rewinding said fed film toward said patrone chamber; and control means for controlling operation of said film feed means in response to an output of said first detection means, wherein said control means operates said rewinding means when said first detection means does not detect passage of said film through said [film exposure portion] *aperture* after an elapse of a prescribed time from a start of operation of said film feed means, and wherein said control means stops said rewinding means in response to an output of said second detection means after a start of operation of said rewinding means and operates said film feed means.

4. [A camera] *An apparatus for use with a film* which feeds a film from a film feed opening of a patrone chamber, comprising:

film feed means for feeding said film from said film feed opening to a spool chamber through [a film exposure portion] *an aperture which passes a light therethrough*;

first detection means for detecting whether or not said fed film passes through said [film exposure portion] *aperture*;

second detection means for detecting that a lead of said film exists between said film feed opening and said [film exposure portion] *aperture*;

rewinding means for rewinding said fed film toward said patrone chamber; and control means for controlling operation of said film feed means in response to an output of said first detection means, wherein said control means operates said rewinding means when said first detection means does not detect passage of said film through said [film exposure portion] *aperture* after an elapse of a prescribed time after said second detection means detects passage of said film.

5. [A camera] *An apparatus for use with a film* in accordance with claim 4, wherein said control means stops said rewinding means in response to an output of said second detection means after a start of operation of said rewinding means and operates said film feed means.

6. [A camera] *An apparatus for use with a film* in accordance with claim 5, wherein said control means operates again said rewinding means when said first detection means does not detect passage of the film after said film feed means is operated after the stop of said rewinding means.

7. [A camera] *An apparatus for use with a film* in accordance with claim 6, further comprising:

counting means for counting the number of repetitions of operations of said rewinding means, and operation detecting means for detecting that the counted number of operations exceeds a prescribed number, wherein said control means continues operation of said rewinding means in response to the output of said operation detecting means, irrespective of the output of said second detection means.

8. [A camera] *An apparatus for use with a film* comprising:

a patrone chamber for containing a film patrone;

a spool chamber for winding a film;

[a film exposure portion] *an aperture which passes a light therethrough* having a frame constituting an opening for [exposing said film to] *passing the* light;

film feed means for transporting said film from a film feed opening of said patrone chamber and feeding said film to said spool chamber through said [film exposure portion] *aperture*; and guide means movable between a first position to cover at least a part of said opening and a second position to be away from said opening, for preventing a lead of said film from entering said opening at said first position when said lead of said film passes through said [film exposure portion] *aperture*, and moving to said second position after said lead has passed through said [film exposure portion] *aperture*.

9. [A camera] *An apparatus for use with a film* in accordance with claim 8, wherein said guide means has a lever rotating around a shaft extensible in a direction perpendicular to a film passage surface in said [film exposure portion] *aperture*.

10. [A camera] *An apparatus for use with a film* comprising:

a patrone chamber for containing a film patrone wherein a lead of a film is positioned fully in said patrone chamber when the film patrone is first loaded in the patrone chamber and then the lead is fed from a film feed opening of said patrone chamber;

[a film exposure portion] *an aperture which passes a light therethrough* forming an opening for [exposing a film to] *passing the* light;

film feed means for feeding the film through the film feed opening of said patrone chamber to a spool chamber through said [film exposure portion] *aperture*; and detection means positioned closer to said patrone chamber than to said spool chamber and near said film feed opening for detecting whether or not the lead of the film successfully comes out of the film feed opening.

11. [A camera] *An apparatus for use with a film* in accordance with claim 10, wherein the operation of said film feed means is stopped when said detection means fails to detect the appearance of the lead of the film out of the film feed opening within a prescribed time after a start of the operation of said film feed means.

12. [A camera] *An apparatus for use with a film* in accordance with claim 11, further comprising:

display means for giving an alarm display indicating occurrence of abnormality when the detection by said detection means is not made.

13. [A camera] *An apparatus for use with a film* in accordance with claim 10, wherein said [film exposure portion] *aperture* includes a first edge at the patrone chamber side and a second edge at the spool chamber side, and wherein said detection means is positioned between said film feed opening and the first edge of said [film feed exposure portion] *aperture*.

14. [A camera] *An apparatus for use with a film* in accordance with claim 10, wherein said patrone chamber is arranged so that the film patrone is entered into said patrone chamber in the axial direction of a patrone shaft of the film patrone on which the film is wound.

15. A method of loading a film in [a camera] *an apparatus for use with a film*, comprising the steps of:

feeding a film from a film feed opening to a film winding portion;

detecting whether or not said fed film passes, at a first point located between said film feed opening and said film winding portion; and controlling the feeding of said film dependent on whether or not said film passes at said first point, said controlling step comprising the steps of:

rewinding said film toward said film feed opening when passage of said film at said first point is not detected;

detecting passage of said rewound film at a second point located between said film feed opening and said first point; and feeding said film again to said film winding portion when the passage of said film at said second point is detected.

16. [A camera] *An apparatus for use with a film* comprising:

[a film exposure portion] *an aperture which passes a light therethrough* forming an opening for [exposing a film to] *passing the* light;

a patrone chamber for containing a film patrone, wherein a film is wound on a patrone shaft of the film patrone and a lead of the film exists in said patrone chamber when the film patrone is first loaded in said patrone chamber, said patrone chamber including a film feed opening positioned on the patrone chamber side of the opening of the [film exposure portion] *aperture*;

a film feeding member positioned outside of said patrone chamber for directly engaging with the film to feed the film, wherein said film feeding member does not engage with the film when the film patrone is first loaded in said patrone chamber;

film feed means for feeding the film from said patrone chamber to said film feeding member, said film feed means including means for rotating the patrone shaft of the film patrone in a direction loosening the winding of the film causing the lead of the film to come out of the film feed opening; and detection means positioned between the film feed opening and said film feeding member for detecting whether or not the lead of the film successfully comes out of the film feed opening under an operation of the rotating means.

17. [A camera] *An apparatus for use with a film* in accordance with claim 16, wherein said [film exposure portion] *aperture* includes a first edge at the patrone chamber side and a second edge at the spool chamber side for forming the opening of said [exposure portion] *aperture*, and wherein said detection means is located between the film feed opening and the second edge.

18. [A camera] *An apparatus for use with a film* in accordance with claim 17, wherein said detection means is positioned near the first edge.

19. [A camera] *An apparatus for use with a film* in accordance with claim 16, wherein said patrone chamber is arranged so that the film patrone is entered into said patrone chamber in the axial direction of the patrone shaft of the film patrone.

20. [A camera] *An apparatus for use with a film* in accordance with claim 16, wherein the operation of said film feed means is stopped when said detection means fails to detect the appearance of the lead of the film out of the film feed opening within a prescribed time after a start of the operation of said film feed means.

21. [A camera] *An apparatus for use with a film* in accordance with claim 16, further comprising:

display means for giving an alarm display [indication] *indicating* occurrence of abnormality when the detection by said detection means is not made.

* * * * *